(12) United States Patent
Harrison et al.

(10) Patent No.: US 11,763,335 B2
(45) Date of Patent: Sep. 19, 2023

(54) REAL-TIME DISTRIBUTION OF CRYPTOCURRENCY REWARDS FOR A LOYALTY PROGRAM

(71) Applicant: Gemini IP, LLC, New York, NY (US)

(72) Inventors: Thomas Hungerford Harrison, San Francisco, CA (US); Jason Daniel Camp, Oneonta, NY (US)

(73) Assignee: Gemini IP, LLC, New York, NY (US)

( * ) Notice: Subject to any disclaimer, the term of this patent is extended or adjusted under 35 U.S.C. 154(b) by 296 days.

(21) Appl. No.: 16/552,646

(22) Filed: Aug. 27, 2019

(65) Prior Publication Data

US 2020/0065847 A1 Feb. 27, 2020

Related U.S. Application Data

(60) Provisional application No. 62/723,358, filed on Aug. 27, 2018.

(51) Int. Cl.
*G06Q 30/0226* (2023.01)
*G06F 9/54* (2006.01)
(Continued)

(52) U.S. Cl.
CPC ......... *G06Q 30/0226* (2013.01); *G06F 9/547* (2013.01); *G06Q 20/341* (2013.01);
(Continued)

(58) Field of Classification Search
CPC ............. G06Q 30/0226; G06Q 20/341; G06Q 20/3674; G06Q 30/0215; G06Q 2220/00; G06F 9/547
See application file for complete search history.

(56) References Cited

U.S. PATENT DOCUMENTS 10,762,478 B1 * 9/2020 Maeng ............... G06Q 20/0658
10,783,545 B2 * 9/2020 Swamidurai ........... G06Q 20/36
(Continued)

FOREIGN PATENT DOCUMENTS

WO WO-2018127923 A1 * 7/2018 ............. G06F 21/64

OTHER PUBLICATIONS

Universal bitcoin & ethereum payments platform plutus delivers first batch of NFC debit cards. (Jan. 2, 2018). M2 Presswire Retrieved on Aug. 14, 2021 from URL: <https://dialog.proquest.com/professional/docview/1984417403?accountid=131444>. (Year: 2018).*
(Continued)

*Primary Examiner* — James M Detweiler
*Assistant Examiner* — Monica A Mandel
(74) *Attorney, Agent, or Firm* — Lee & Hayes, P.C.

(57) ABSTRACT

Introduced here are computer programs and associated computer-implemented techniques for guaranteeing a cardholder her reward for using a specialized payment card to complete a transaction based on the price of an asset when the transaction actually occurs. Acting as a digital safeguard, the technology ensures that a platform responsible for disbursing the asset will be able to account for ineligible transactions. The technologies described herein may allow the cardholder to benefit from having her reward invested in a lower risk manner. Moreover, these technologies may allow the cardholder to benefit from gains in the value of the asset over the course of a payment cycle in contrast to conventional loyalty programs.

20 Claims, 20 Drawing Sheets

(51) Int. Cl.
*G06Q 20/34* (2012.01)
*G06Q 20/36* (2012.01)
*G06Q 30/0207* (2023.01)

(52) U.S. Cl.
CPC ....... *G06Q 20/367* (2013.01); *G06Q 20/3674* (2013.01); *G06Q 30/0215* (2013.01); *G06Q 2220/00* (2013.01)

(56) References Cited

U.S. PATENT DOCUMENTS

| | | | | |
|---|---|---|---|---|
| 10,909,529 | B2* | 2/2021 | Ortiz | G06F 16/27 |
| 11,049,128 | B1* | 6/2021 | Olson | G06Q 30/0226 |
| 11,270,299 | B2* | 3/2022 | Bankston | G06Q 20/405 |
| 2015/0134438 | A1* | 5/2015 | Chavarria | G06Q 30/0226 705/14.27 |
| 2016/0005029 | A1* | 1/2016 | Ivey | G06Q 20/409 705/44 |
| 2016/0012424 | A1* | 1/2016 | Simon | G06Q 20/3674 705/67 |
| 2016/0342977 | A1* | 11/2016 | Lam | G06Q 20/0658 |
| 2017/0140408 | A1* | 5/2017 | Wuehler | G06Q 30/0207 |
| 2017/0236143 | A1* | 8/2017 | Code | G06Q 20/387 705/14.27 |
| 2018/0268401 | A1* | 9/2018 | Ortiz | G06Q 20/204 |
| 2018/0300705 | A1* | 10/2018 | Link | G06Q 20/24 |
| 2019/0073666 | A1* | 3/2019 | Ortiz | G06F 16/27 |
| 2019/0108542 | A1* | 4/2019 | Durvasula | G06Q 20/3829 |
| 2019/0147486 | A1* | 5/2019 | Monaco | G06Q 20/102 705/14.38 |
| 2019/0220856 | A1* | 7/2019 | Li | G06Q 20/10 |
| 2019/0259007 | A1* | 8/2019 | LaMontagne | G06Q 20/3829 |
| 2020/0005283 | A1* | 1/2020 | Zimmerman | G06Q 20/20 |
| 2021/0117962 | A1* | 4/2021 | Ortiz | G06Q 20/3674 |

OTHER PUBLICATIONS

Shelper, Philip, Andrew Lowe, and Salil S. Kanhere. "Experiences from the Field: Unify Rewards—A Cryptocurrency Loyalty Program." Proceedings of the Symposium on Foundations and Applications of Blockchain. 2018. (Year: 2018).*

"Thesis:Card Rewards—A Realistic Use Case for Blockchain" Web<www.paymentsjournal.com/thesis-card-rewards-a-realistic-use-case-for-blockchain/>04-18,retrv.Wayback Mach. <web.archive.org/web/20180510131349/https://www.paymentsjournal.com/thesis-card-rewards-a-realistic-use-case-for-blockchain/>on May 23, 2018.*

Shelper et al. "Experiences from the Field: Unify Rewards—A Cryptocurrency Loyalty Program." Symposium on Foundations and Applications of Blockchain. vol. 20., pp. 2-7, Mar. 9, 2018. (Year: 2018).*

* cited by examiner

REAL-TIME DISTRIBUTION OF CRYPTOCURRENCY REWARDS FOR A LOYALTY PROGRAM

CROSS-REFERENCE TO RELATED APPLICATIONS

This application claims priority to U.S. Provisional Application No. 62/723,358 filed on Aug. 27, 2018, which is incorporated herein by reference in its entirety.

TECHNICAL FIELD

Various embodiments concern computer programs and associated computer-implemented techniques for distributing cryptocurrency, tokenized real-world assets, and/or digitally-native tokens to individuals who complete transactions involving payment cards.

BACKGROUND

Loyalty programs are structured marketing strategies designed by merchants to encourage customers to continue to shop at, or use the services of, businesses associated with each program. These loyalty programs exist in a variety of different commercial contexts, and each loyalty program may have different features, rewards schemes, etc.

Some merchants distribute loyalty cards (also referred to as a "rewards cards," "points cards," "advantage cards," "club cards," or "co-brand cards") that identify the customers as a participant in a loyalty program, while other merchants simply notify the customers that they have been associated with a digital account. A customer can earn a benefit by presenting a loyalty card or an identifier (e.g., a telephone number, email address, or physical address) associated with a digital account. Generally, the benefit takes the form of either a discount on the current purchase or an allotment of points that can be used for a future purchase, reward item, etc.

Many financial institutions are associated with a loyalty program in which a percentage of the amount spent is paid back to participants. Examples of financial institutions include credit card companies (also referred to as "card issuers") and banks. These loyalty programs may encourage individuals to apply for a payment card and then use the payment card by providing a reward in the form of money, points, frequent flyer miles, etc. When a card issuer operates a loyalty program, cardholders typically receive between 0.5% and 2.0% of their net expenditure as a monthly rebate, which may be credited to the card account or paid to the cardholder separately.

Card issuers normally allocate rewards to cardholders on a periodic basis (also referred to as a "cycle"). For instance, a card issuer may allocate rewards every four weeks, month, etc. Generally, the cardholders belonging to a specific loyalty program will be split into 15-25 subsets, each running on a unique cycle. Moreover, card issuers generally provide rewards to cardholders on the cycle date based on the purchases completed during the previous period as determined by the cycle length. For instance, if a cycle is 30 days, then the issuer would grant rewards on the cycle date based on purchases completed over the past 30 days.

The card issuer usually receives transaction data specifying the transactions completed during the current cycle for each cardholder from a payment processor. This transaction data may be received in the form of a rewards file. While the card issuer may receive transaction data from the payment processor on a quasi-daily basis, the card issuer will only receive the transaction data for each subset of cardholders once per cycle. For instance, a payment processor might provide a rewards file to a card issuer on the 15th of every month that contains the transaction data, for the cardholders belonging to a given subset, of the previous 30 days.

Paying rewards only once per cycle reduces the complexity for card issuers. Such a strategy saves these card issues valuable time, capital, and compute resources. Additionally, it lowers the likelihood that rewards are distributed for incomplete, ineligible, or fraudulent transactions. For instance, if an item is purchased on the fourth day of the current cycle and returned on the twenty-eighth day of the current cycle, the card issuer will not disburse a reward for that purchase on the cycle date. Because the time value of receiving most rewards at/near the time of a transaction (i.e., rather than at the end of a cycle) is small, cardholders do not experience much, if any, downside. Said another way, the nature of rewards awarded by card issues ensures that little value is lost despite these rewards only being distributed periodically.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
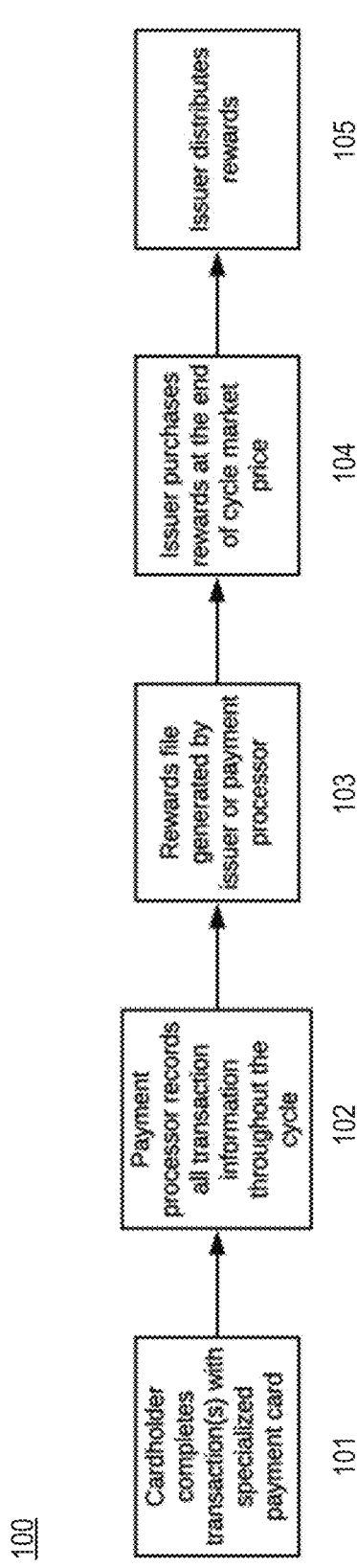
FIG. 1 depicts a flow diagram of a process for allocating cryptocurrency as a reward to a cardholder.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Card issuers have begun proposing new reward options (also referred to as "reward assets") such as cryptocurrencies, tokenized real-world assets, and digitally-native tokens. The term "tokenized real-world asset," as used herein, refers to a real-world asset that is represented as a digital token on a distributed ledger such as a blockchain. The term "digitally-native token," as used herein, refers to a digital token that represents a digital good. One example of a digitally-native token is a non-fungible token for a virtual cat (also referred to as a "cryptokitty"). These new reward options are seen as investable assets that provide cardholders the opportunity to experience gains in the value of these rewards, unlike traditional rewards such as cash, points, airline miles, etc.

Generally, if a card issuer were to offer cryptocurrency as a reward, the card issuer would adhere to the industry-standard cycles. Thus, the payment processor would provide a rewards file for a given subset of cardholders to the card issuer once per cycle and the card issuer would calculate the amount of cryptocurrency owed to each cardholder in the given subset based on the market price of the cryptocurrency on the cycle day. For example, a cardholder might earn one-hundred dollars' worth of Bitcoin as a reward for ten purchases completed over the course of a cycle. If those ten purchases occurred during the first week of the cycle when Bitcoin had a market price of $5,000, the cardholder should be entailed to one-hundred dollars' worth of Bitcoin at a market price of $5,000. However, since the card issuer would not receive the rewards file until the end of the cycle, the card issuer would calculate the reward owed to the cardholder based on the then-current price of Bitcoin. If Bitcoin were to have a market price of $10,000 at the end of the cycle, the issuer would determine the cardholder is owed one-hundred dollars' worth of Bitcoin at a market price of $10,000. This traditional disbursement process greatly disadvantages the cardholder. Here, for example, if the cardholder were to earn or receive her reward based on the market price of Bitcoin during the first week of the cycle, the reward would have doubled in value.

When rewards are invested into an asset that a cardholder views as a long-term investment, it greatly benefits the cardholder to receive the rewards (or have the rewards invested in the asset) as close to the time of transaction as possible. There are several different reasons for this. First, early investment in an asset provides the cardholder an opportunity to experience gains in the asset over the course of a cycle (also referred to as a "payment period"). For example, a reward immediately invested in cryptocurrency for a transaction occurring within the first week of a payment period can gain value over the course of the payment period. Second, by investing in an asset near the time of each transaction (i.e., rather than at the end of the cycle), the rewards can be averaged into the investment over the course of the payment period. Thus, by investing and/or distributing a series of smaller rewards, the overall investment risk can be lowered. This investment practice is commonly referred to as "dollar cost averaging," and it can be used to reduce the impact of volatility, a well-known feature of cryptocurrencies.

Introduced here, therefore, are techniques for acquiring, allocating, and/or distributing cryptocurrency to individuals as rewards for completing transactions involving specialized payment cards. The term "specialized payment card," as used herein, may refer to a payment card having particular technology (e.g., hardware, firmware, or software) for facilitating secure transactions that are rewarded with cryptocurrency, or simply a payment card having special branding (e.g., for the cryptocurrency reward platform). A cryptocurrency rewards platform (also referred to as "rewards platforms" or "platforms") can facilitate the real-time investment and/or issuance of cryptocurrency as rewards so that cardholders can benefit from increases in the value of these cryptocurrencies, as well as decreases in the risk of these investments. Moreover, these techniques allow the card issuer and/or the cryptocurrency rewards platform to reduce the risk associated with issuing assets as rewards before the conclusion of a cycle or some other redemption threshold.

The specialized payment card may allow cardholders to invest in cryptocurrencies without fees, without risking personal savings, and without dedicating significant time to the investment process. Instead, a platform can automatically facilitate, manage, and promote cryptocurrency investments/acquisitions on behalf of cardholders through a program similar to a loyalty program. Note that, in some embodiments, a management service associated with the platform may charge a fee (e.g., a monthly fee, annual fee, or transaction fee) for the specialized payment card, activities (e.g., blockchain-based transactions) that must be performed to deliver cryptocurrency, etc. Additionally or alternatively, the management service may award cryptocurrency at a higher price than its acquisition price to earn a spread.

Figure 25:
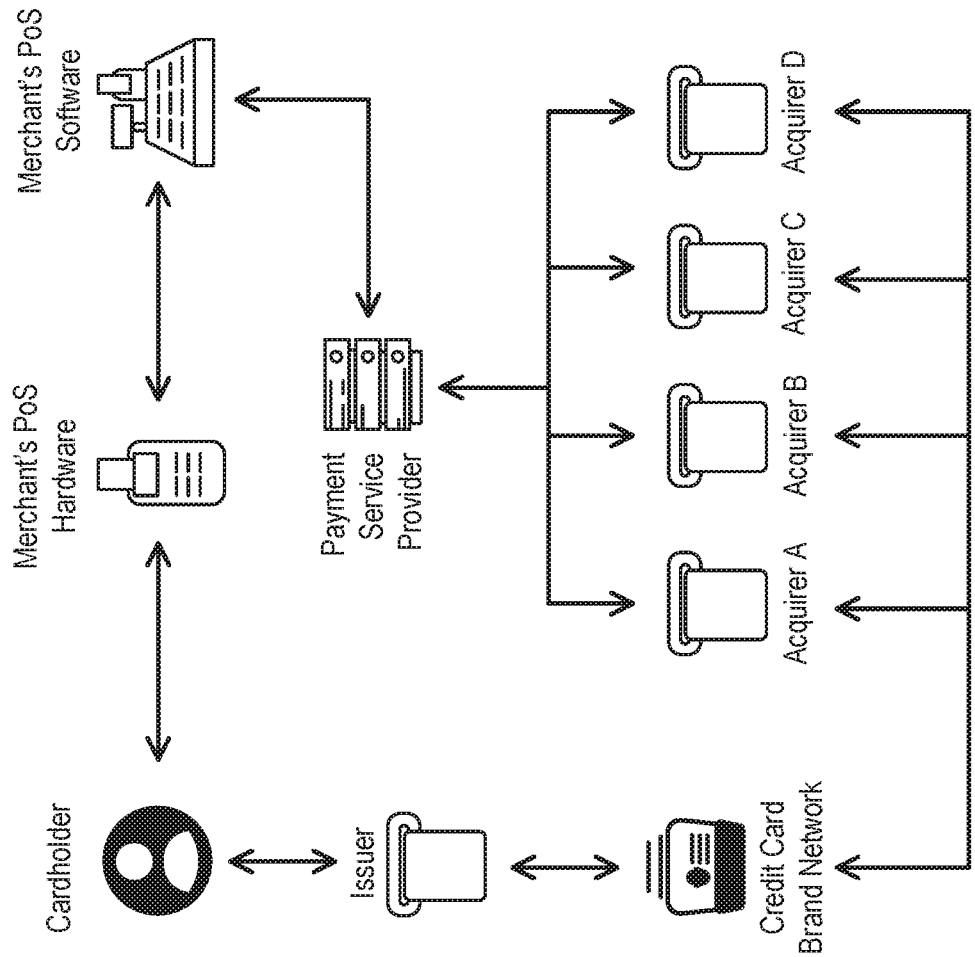
FIG. 25 illustrates an example of a conventional payment process completed using a payment card.

The technology described herein generally pertains to computer-implemented techniques for acquiring, investing, and/or distributing assets (e.g., cryptocurrencies) as a reward proximate to the time that the payment card transactions are completed by cardholders. In some embodiments assets are issued in conjunction with the payment card transaction (e.g., when the payment is verified by the card issuer, which generally occurs within 24-48 hours), while in other embodiments reward assets are issued periodically (e.g., every 12, 24, or 48 hours). The assets could also be issued to each cardholder after the cardholder has reached a redemption threshold (e.g., following the conclusion of a cycle, after determining the value of the reward exceeds a predetermined threshold, etc.). To provide the service, connections may need to be established between eight different entities: (1) a cryptocurrency rewards platform; (2) a merchant; (3) one or more financial institutions; (4) a cardholder; (5) a payment network (also referred to as an "association"); (6) a payment processor (also known as a "payment service provider"); (7) a cryptocurrency exchange; and (8) an information tokenization service. The financial institution(s) may include the issuing bank (i.e., the bank responsible for issuing the specialized payment card) or the acquiring bank (i.e., the bank responsible for receiving payment on behalf of a merchant). FIG. 25 illustrates an example of a conventional payment process completed using a payment card. The cryptocurrency rewards platform described herein, however, may communicate with the payment processor to facilitate the disbursement of rewards for using specialized payment cards to complete transactions. If a rewards service responsible for operating the cryptocurrency rewards platform issues the specialized payment cards itself, then the cryptocurrency rewards platform may be communicatively stationed between the payment processor and card issuer. Alternatively, if the rewards service licenses the cryptocurrency rewards platform to the card issuer, the cryptocurrency rewards platform may only be communicatively connected to the card issuer. In such embodiments, the cryptocurrency rewards platform may receive data indicative of transactions completed using the specialized payment cards from the card issuer.

Rewards are generally awarded based on specific transactions completed by a cardholder using a specialized payment card. When the cardholder completes a transaction, the merchant will route information regarding the transaction (e.g., via a payment processing terminal) to an acquiring bank or a payment processor responsible for processing payments on behalf of the acquiring bank. Then, the information (or data indicative of the information) can be shared with the card issuer by the acquiring bank or the payment processor through the network. If there are sufficient funds available, the card issuer can send an authorization code through the network to the acquiring bank, who can then approve the purchase.

Throughout the day, the merchant may store information associated with each transaction. For example, the authorization codes may be compiled in a data file hosted on a credit card terminal, processing software, or electronic payment gateway. Then, at the conclusion of the day, the merchant can send the entire "batch" of transaction information to the payment processor to begin the settlement stage (also referred to as "batch processing"). The payment processor examines, sorts, and forwards the transaction information to the appropriate issuing bank(s) for settlement. In some instances, the payment processor stores the batch of transaction information for a period of time before sending it onward through the network. Thereafter, the network may request payment from the card issuer for each transaction. The card issuer can send the requested funds through the network, and the requested funds can ultimately be deposited into the merchant's account with the acquiring bank. For most of this process, transactions will be listed as "pending" or "processing" in the cardholder's account.

As noted above, card issuers generally do not issue rewards for transactions until the transactions have been cleared. Even after the transactions have been cleared, card issuers tend to wait until the conclusion of a cycle when a rewards file is received to simplify the process of issuing rewards, as well as lessen the chance that rewards are issued for ineligible transactions (e.g., those involving returned goods, fraud, etc.).

To facilitate the issuance of rewards in near real time, a card issuer may guarantee a cardholder her reward at the price of an asset (e.g., a cryptocurrency) when the transaction for which the reward is being issued is completed. This price may be referred to as the "strike price." However, the cardholder may not actually receive custody of the asset until a later time. For example, the asset may not be made accessible until a series of tests (also referred to as "reward redemption thresholds" or "redemption thresholds") are completed, thereby ensuring the transaction(s) for which the reward was issued are legitimate (and thus eligible for rewards). These redemption thresholds may be particularly valuable when making the asset available involves a blockchain transaction since blockchain transactions are generally irreversible. The technology described herein allows the rewards to be invested in an asset at/near the time of the transaction, which provides the cardholder an opportunity to realize an increase in value of the asset over the course of the cycle. Additionally, if the asset is cryptocurrency, the risk of investing in cryptocurrency can be lowered through determining, acquiring, and/or distributing appropriate amounts of cryptocurrency on a continuous or periodic (e.g., daily) basis, thereby implementing dollar cost averaging. Thus, the card issuer can avoid the risk of allotting rewards before ensuring that the rewards were rightly earned while still providing a unique value proposition to the cardholder. As further described below, the service could be provided in a variety of different ways.

Generally, a platform will be managed by, or operate on behalf of, a card issuer. Thus, the technologies introduced herein may be described as being employed by the card issuer for the purpose of illustration. However, those skilled in the art will recognize that these technologies could be employed by some other entity. Accordingly, the technologies could be employed by some other entity (i.e., other than the card issuer) unless otherwise noted.

Embodiments may be described with reference to particular cryptocurrencies (e.g., Bitcoin) for the purpose of illustration. However, those skilled in the art will recognize that these features are equally applicable to other cryptocurrencies (e.g., Ethereum, Ripple, or a propriety digital currency) and other financial instruments, such as tokenized real-world assets, digitally-native tokens, exchange-traded funds (ETFs), stocks, etc. Accordingly, unless contrary to possibility, the features described herein could be employed to facilitate the disbursement of tokenized real-world assets and/or digitally-native tokens in addition to, or instead of, cryptocurrency.

The technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program an electronic device to perform a process for examining data related to transactions completed using a specialized payment card, establishing an appropriate reward amount in fiat currency, converting the appropriate reward amount into at least one cryptocurrency, distributing the at least one cryptocurrency into at least one wallet associated with a cardholder, etc. The transaction data may be provided by a financial institution, such as a bank, or a payment processor.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Technology Overview

FIG. 1 depicts a flow diagram of a process 100 for allocating cryptocurrency as a reward to a cardholder. Initially, the cardholder completes one or more transactions using a specialized payment card (step 101). As these transaction(s) are completed, information related to the transaction(s) will be transmitted by an acquiring bank (also referred to an "acquirer") and/or a payment processor to the card issuer as part of the approval/verification process. Thus, the card issuer may receive information regarding these transaction(s) from the acquirer and/or the payment network through a network. For example, the payment processor may record information regarding the transactions completed by the cardholder throughout a cycle (step 102) and then generate a rewards file based on the information (step 103) that can be sent to the card issuer.

The card issuer may record each transaction that is completed throughout a cycle having a predetermined length. For example, the cycle may last a series of weeks (e.g., two, four, or eight weeks), a month, etc. In other embodiments, the card issuer may monitor the transaction(s) until a reward redemption threshold is reached. The reward redemption threshold may be defined by a monetary amount (e.g., $1, $10, $25, $100, $1,000, $2,000, $5,000, etc.). Generally, the cardholder will need to complete multiple transactions to reach the monetary amount over several weeks, months, etc.

Following the conclusion of the cycle, the card issuer can determine which transactions, if any, are eligible for a reward. Generally, this determination is made by the payment processor and indicated in the rewards file provided to the card issuer. The rewards file may be calculated in accordance with a set of criteria as determined by the card issuer and/or the payment processor. This allows card issuers to ensure that rewards are not distributed for incomplete, ineligible, or fraudulent transactions. For example, if a cardholder returns a purchased good to a merchant, a reward should not be distributed for that transaction. Moreover, calculating and distributing rewards only once per cycle simplifies an otherwise complex and resource-intensive process for card issuers. After an appropriate reward is established, the card issuer may purchase the reward (step 104) and then distribute the reward to the cardholder (step 105). Alternatively, the card issuer may issue a previously-purchased reward to the cardholder. In some embodiments, the reward is in the form of cash, points, or some other item that the cardholder can manually redeem or invest into another asset. In other embodiments, the reward is automatically invested into an asset that is granted to the cardholder as the reward. For example, a cryptocurrency rewards platform may automatically disburse one or more cryptocurrencies as part of a loyalty program. Additional information on how cryptocurrencies can be disbursed in the context of a loyalty program can be found in U.S. application Ser. No. 16/523, 814, which is incorporated herein by reference in its entirety.

When the reward is in the form of a cryptocurrency, the process shown in FIG. 1 is associated with a fairly significant financial risk since all investments are lumped into a single period of time at the conclusion of the payment period (i.e., rather than distributed over the entirety of the cycle). This process can also hurt potential returns on these rewards by delaying the timing of the investment until the conclusion of the cycle (i.e., rather than when the transactions are actually completed). However, there are several reasons that card issuers continue to disburse rewards as shown in FIG. 1. One benefit of the process 100 is that the card issuer is protected from issuing rewards for incomplete, ineligible, or fraudulent transactions. Another benefit of the process 100 is that it is more efficient for the card issuer to batch the rewards into a lump sum based on a period of time rather than calculate rewards on a continuous basis.

Introduced here, therefore, are computer programs and associated computer-implemented techniques for guaranteeing, and in some embodiments delivering, a cardholder her rewards at the price of the asset on/near the time at which the corresponding transactions were completed. For example, if a cardholder completes a series of transactions over the course of a one-month cycle, the appropriate reward may be acquired by a rewards platform (or simply "platform") as the series of transactions are completed, approved, etc. However, the collective reward for the entire cycle may not be issued to the cardholder until the conclusion of the entirety of the month. The technology allows the cardholder to benefit from any potential gain in the value of the reward over the course of the payment period. Additionally, the technology lowers the risk of reward investment through dollar cost averaging.

Figure 2:
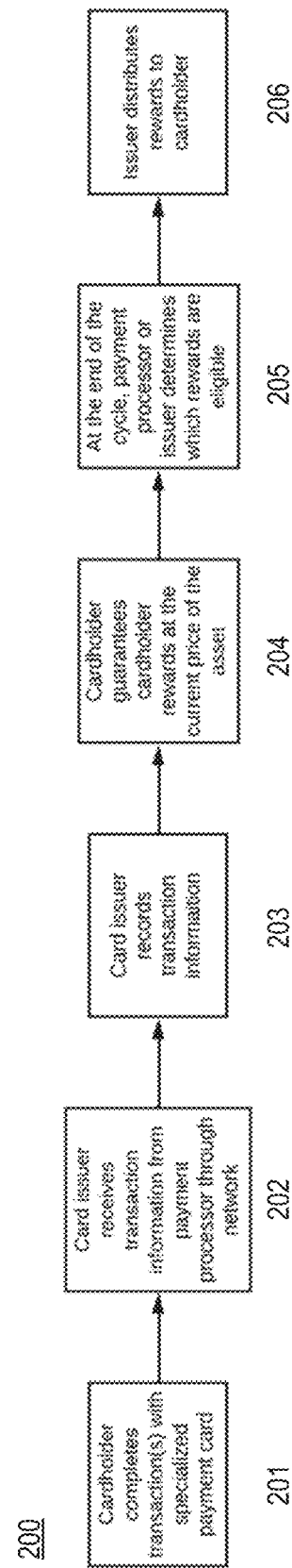
FIG. 2 depicts a flow diagram of a process for acquiring, investing, and/or issuing a reward at/near the time at which a cardholder completes a transaction using a specialized payment card.

FIG. 2 depicts a flow diagram of a process 200 for acquiring, investing, and/or issuing a reward at/near the time at which a cardholder completes a transaction using a specialized payment card. The process 100 shown in FIG. 1 may be largely similar to the process 200 of FIG. 2. The cardholder can complete transaction(s) using a specialized payment card (step 201), and then the card issuer can receive information regarding these transaction(s) from a payment processor through a network (step 202). Thereafter, the card issuer may record the information (step 203) so that the rewards can be guaranteed at the current market price of the asset (step 204). At the conclusion of the cycle, the payment processor or the card issuer can determine which transactions, if any, are eligible for rewards (step 205). Then, the card issuer can disburse the appropriate amount of the asset to the cardholder as the reward (step 206).

Figure 22:
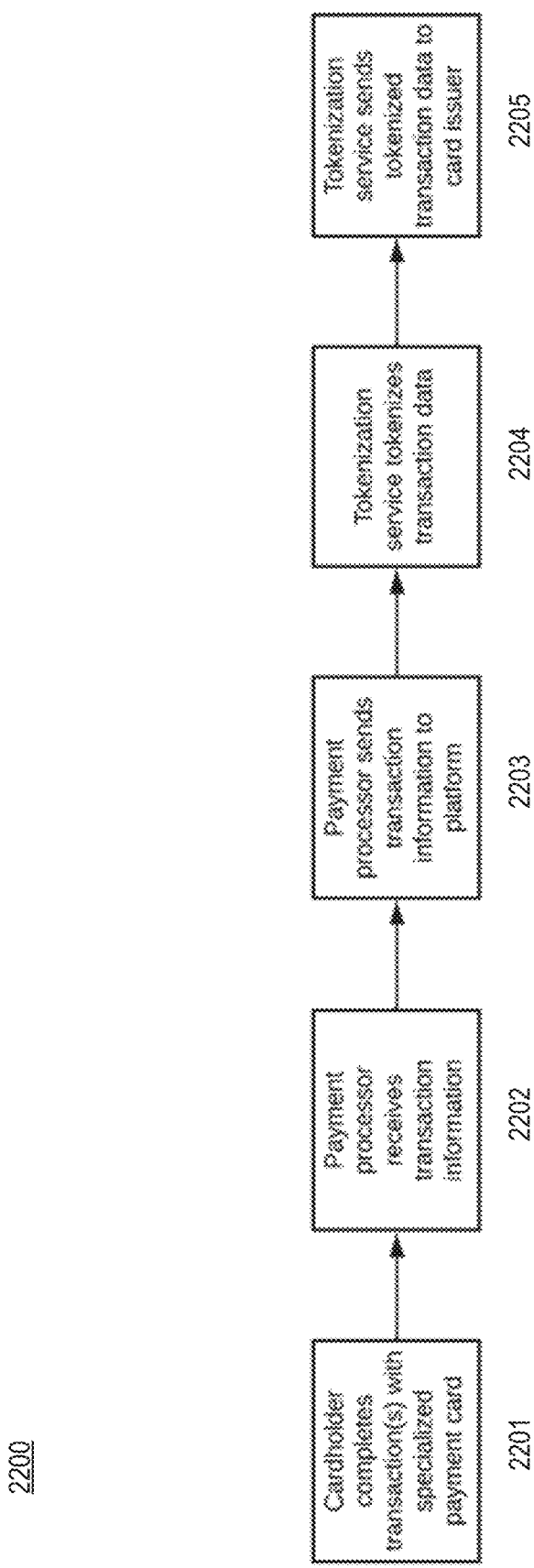
FIG. 22 displays a process in which the platform only receives the transaction information after it has been tokenized.

In some embodiments, the card issuer may receive the transaction information from a third-party tokenization service. One of the benefits of such an approach is that it allows the card issuer to avoid holding sensitive data, which would require compliance with the Payment Card Industry Data Security Standard (PCI DSS). FIG. 22 displays a process 2200 in which the platform only receives the transaction information after it has been tokenized. Initially, the cardholder will complete transaction(s) using a specialized payment card (step 2201), and the payment processor will receive transaction information representative of the transaction(s) (step 2202). The payment processor can then send the transaction information to the platform (step 2203). However, before the platform receives the transaction information, it may first be tokenized by a third-party service for security purposes (step 2204). Only after the transaction information is tokenized, will it be relayed to the platform (step 2205). The tokenized transaction information may be relayed to the platform directly from the tokenization service or by the payment processor upon receiving the tokenized transaction information from the tokenization service.

Rather than invest the rewards earned during a cycle at the market value of an asset at the end of the cycle, the card issuer can instead guarantee each reward at the market value of the asset at/near the time the corresponding transaction actually occurred. Such an outcome can be achieved in several different ways.

Figure 3:
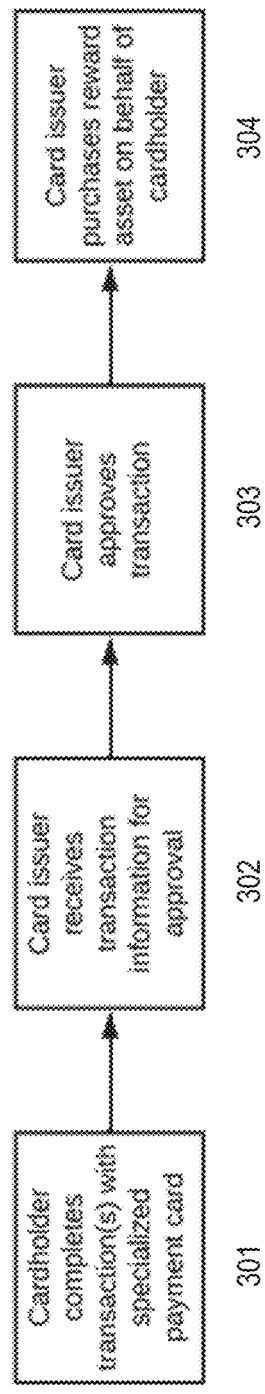
FIG. 3 depicts a flow diagram of a process in which the card issuer automatically purchases the reward asset responsive to receiving information indicative of a request to approve the transaction.
Figure 4:
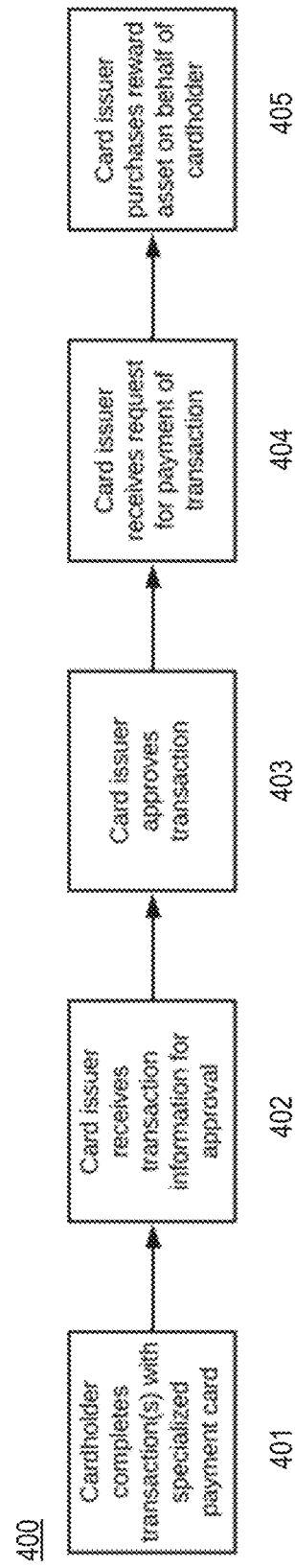
FIG. 4 depicts a flow diagram of a process in which the card issuer automatically purchases the reward asset responsive to receiving information indicative of a request for payment of the transaction.
Figure 5:
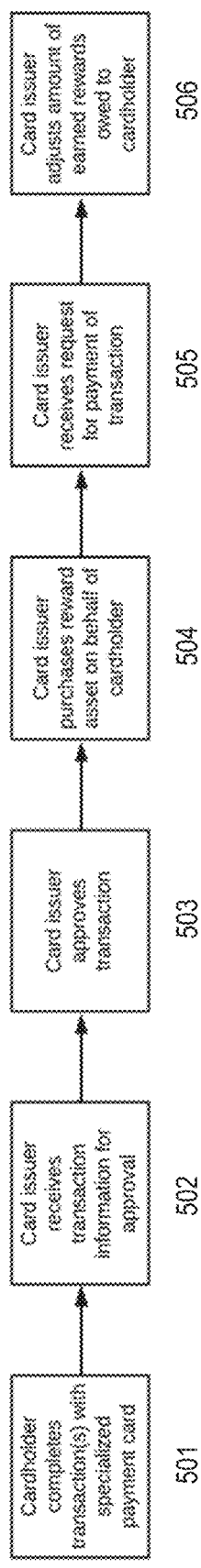
FIG. 5 depicts a flow diagram of a process in which the card issuer purchases the asset reward after approving the transaction, and then adjusts the reward amount guaranteed to the cardholder, if necessary, after receiving information indicative of a request for payment of the transaction.

As shown in FIGS. 3-5, the card issuer may purchase the asset to be disbursed as the reward earned by the cardholder responsive to receiving information regarding the transaction (e.g., for the purpose of approval, verification, etc.). In order to purchase an asset such as cryptocurrency, a rewards platform (also referred to as the "platform") may add a payment method to an exchange. In some embodiments the platform is managed by the card issuer, while in other embodiments the platform is licensed by the card issuer from a third party. One technique for accomplishing this involves providing information related to a bank account associated with the platform to the exchange as a payment method via an application programming interface (API). Such action would allow the platform to automatically remit funds from its bank account to an account on the exchange. The exchange account could belong to the platform or another entity, such as the exchange itself or the card issuer responsible for issuing the specialized payment cards.

Figure 6:
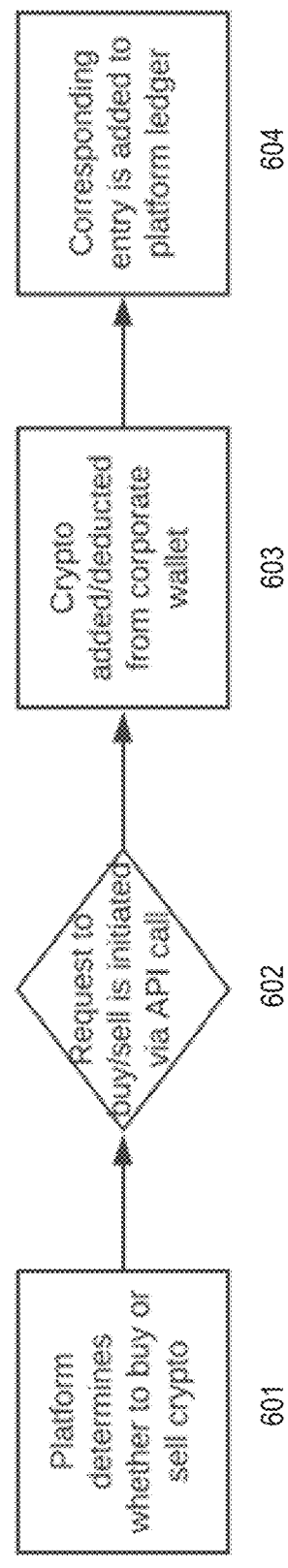
FIG. 6 illustrates an example of a process for purchasing or selling an asset to be disbursed as a reward.

The rewards platform can make calls via API(s) to discover the price of cryptocurrency across different exchanges and then use that information to determine where to purchase cryptocurrency. Through an API call to an exchange, the platform can purchase, sell, and transfer cryptocurrency. If cryptocurrency is purchased, it can be stored in a digital wallet belonging to the platform. This digital wallet may be referred to as a "corporate wallet." Any transaction through an exchange and/or involving the corporate wallet may be recorded by the platform as a corresponding entry in its ledger. This enables the platform (and thus the card issuer) to track purchases, sales, and transfers of assets for each account associated with a cardholder, as well as for all cardholders as a whole. FIG. 6 illustrates an example of a process 600 for purchasing or selling an asset to be disbursed as a reward. First, the platform makes the determination to purchase or sell cryptocurrency (step 601). Then, a request to buy or sell cryptocurrency can be made through an API call to an exchange (step 602). Once the cryptocurrency is added or deducted from an account (e.g., a corporate wallet) (step 603), a corresponding entry is added to the ledger maintained by the platform (step 604). Additional information on how cryptocurrencies can be purchased in the context of a loyalty program can be found in U.S. application Ser. No. 16/523,814.

FIG. 3 depicts a flow diagram of a process 300 in which the card issuer automatically purchases the reward asset responsive to receiving information indicative of a request to approve the transaction. After the cardholder completes a transaction with a specialized payment card (step 301), the card issuer may receive information indicative of the transaction for approval (step 302). After the card issuer approves the transaction (step 303), a cryptocurrency rewards platform can purchase the reward asset on behalf of the cardholder (step 304). As noted above, the platform will generally be managed by, or operate on behalf of, the card issuer. However, the platform may be operated by some other entity.

Figure 18:
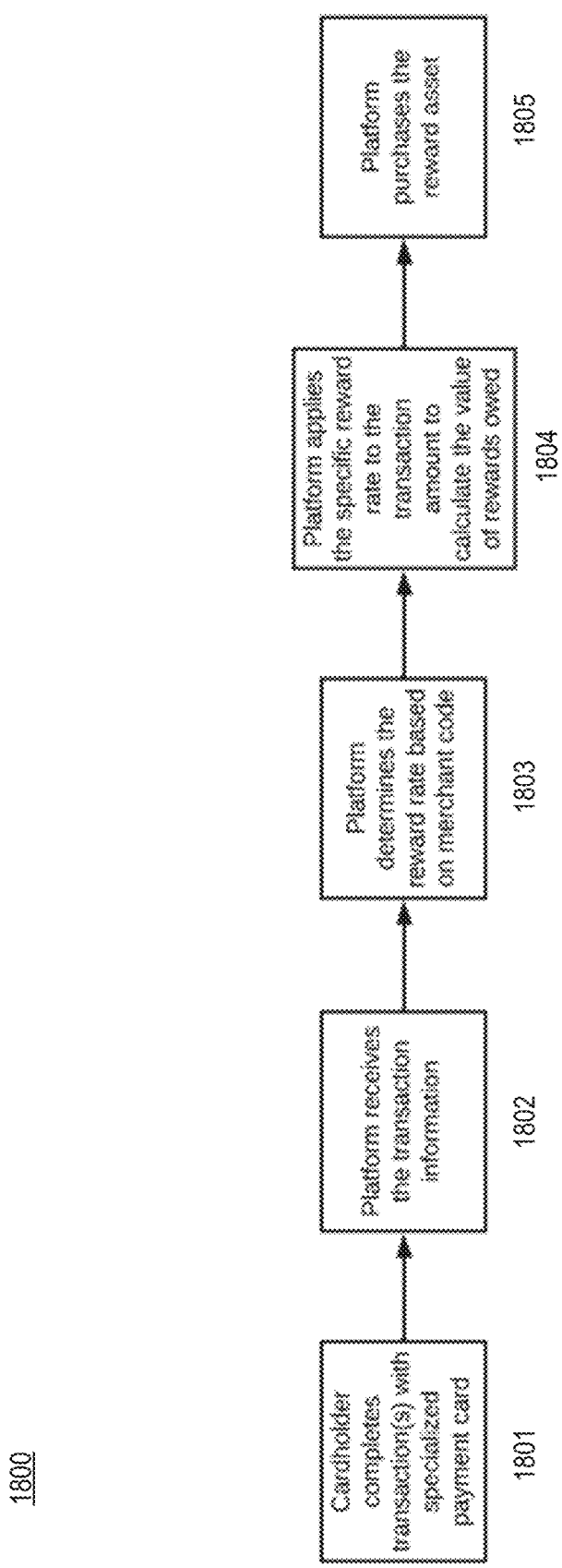
FIG. 18 depicts a flow diagram of a process in which the platform automatically calculates the correct amount of rewards due to the cardholder based on the transaction amount and merchant code.

In order to determine the amount of cryptocurrency to purchase, the platform can view the value of a transaction and, based on a set reward rate, calculate the reward owed for completing that transaction. In some cases, different rewards rates can be set for different merchant codes. In order to determine the correct reward rate for different merchants, the platform keeps a ledger with the reward rate due for each merchant code. When the platform receives the transaction information, it can determine the reward rate for that specific merchant through the ledger and calculate the value of reward owed to the cardholder for that transaction. FIG. 18 depicts a flow diagram of a process 1800 in which the platform automatically calculates the correct amount of rewards due to the cardholder based on the transaction amount and merchant code. After the cardholder completes a transaction using a specialized payment card (step 1801) and the platform receives the transaction information (step 1802), the platform can determine the reward rate owed on the transaction based on the merchant code (step 1803). The merchant code may be stored in a ledger maintained by the platform, a merchant account generated by the platform, etc.

Then, the platform can calculate the value of the reward owed to the cardholder by applying the reward rate to the transaction amount as determined from the transaction information (step 1804). For example, the platform may purchase the cryptocurrency through an API call to an exchange (step 1805) and then cause the purchased cryptocurrency to be transferred to the cardholder as a reward. Alternatively, the platform may designate cryptocurrency that is presently held in a corporate wallet to be reserved for the cardholder. Steps 1803 and 1804 of the process 1800 of FIG. 18 may occur after step 303 but before step 304 of the process 300 of FIG. 3.

The process 1800 of FIG. 18 may be repeated for each transaction completed by a given cardholder. This method of automatically purchasing the reward asset in the amount earned by the cardholder at/near the time of transaction allows the cardholder to benefit from decreased investment risk through more extensive averaging into the investment as well as any gains from an increase in the price of the asset. Alternatively, the process 1800 of FIG. 18 could be repeated for batches of transactions, such as all transactions that occur on a daily basis. Both embodiments provide substantial benefits over a conventional process in which the reward asset would only be acquired and disbursed at the end of the cycle.

FIG. 4 depicts a flow diagram of a process 400 in which the card issuer automatically purchases the reward asset responsive to receiving information indicative of a request for payment of the transaction. Steps 401-403 of FIG. 4 may be largely similar to steps 301-303 of FIG. 3. Here, however, the card issuer waits until request of payment for the transaction (step 404) before it purchases the reward asset on behalf of the cardholder (step 405). Again, steps 1803 and 1804 of the process 1800 of FIG. 18 may occur after step 404 but before step 405.

FIG. 5 depicts a flow diagram of a process 500 in which the card issuer purchases the asset reward after approving the transaction, and then adjusts the reward amount guaranteed to the cardholder, if necessary, after receiving information indicative of a request for payment of the transaction. Steps 501-504 of FIG. 5 may be largely similar to steps 301-304 of FIG. 3. Here, however, the card issuer receives request of payment for the transaction that is in an amount different than the original amount (step 505) and therefore must adjust the amount of rewards due to the cardholder (step 506). Again, steps 1803 and 1804 of the process 1800 of FIG. 18 may occur after step 503 but before step 504. Additionally, step 1804 of the process 1800 of FIG. 18 may occur again after step 505.

By first approving the transaction, the card issuer can be sure that the transaction is actually completed. The embodiments shown in FIGS. 3-5 allow the cardholder to benefit from any increase in the value of their earned rewards. Moreover, because the earned rewards are automatically purchased on behalf of the cardholder over the course of the payment period, investment risk is also lowered.

Figure 7:
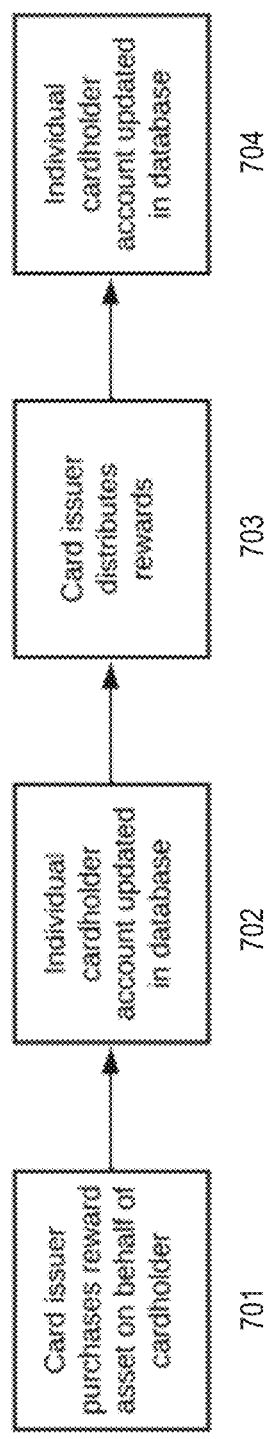
FIG. 7 depicts a flow diagram of a process where a cardholder account is updated after various actions by the card issuer.

The platform may create a separate account for each cardholder and then record information necessary for identifying, calculating, and distributing rewards earned by each cardholder to the appropriate account. Such information could include the amount of rewards earned, the amount of rewards owed, the type of reward asset desired by the cardholder, the digital wallet address of where to deliver rewards, and personally identifiable information (PII). When the platform purchases a reward asset on behalf of a cardholder, the platform may update the cardholder's account with this information. Any changes to the balance, such as if the reward assets are distributed to the cardholder or if some rewards are recollected due to them becoming ineligible, will be reflected in the account. Such a technique allows the platform to continuously monitor reward purchases and distributions for each individual account. FIG. 7 depicts a flow diagram of a process 700 where a cardholder account is updated after various actions by the card issuer. When a cardholder earns a reward, the platform may purchase the cryptocurrency reward (step 701). This purchase will be recorded by the platform in a ledger. Moreover, the platform may note the purchase in an account (also referred to as a "profile") associated with the cardholder (step 702). The cryptocurrency reward can then be distributed to the cardholder either immediately or at a later point in time (e.g., following the conclusion of a cycle) (step 703). After the reward is distributed, the platform may again record the transaction in its ledger and/or update the cardholder account to show that the reward has been delivered (step 704). Additional information on how information corresponding to transactions can be recorded by the platform can be found in U.S. application Ser. No. 16/523,814. It is also possible that actions by the cardholder could cause the account to be updated. For example, the account may be updated if the cardholder returns a previously-purchased item or seeks a discount on a previously-rendered service.

In the embodiments shown in FIGS. 3-5, the platform could hold the asset reward on behalf of the cardholder until specific redemption threshold(s) are met. For example, a card issuer may hold the asset reward until the conclusion of a cycle (e.g., the end of the one-month period), the payment transaction has been verified as eligible for a reward, a specific reward amount is reached, etc. While these embodiments are described as being performed by a card issuer, those skilled in the art will recognize that these actions may be performed by a platform managed by some other entity. For instance, the platform may be managed by a rewards service that disburses assets as rewards on behalf of the card issuer.

Figure 8:
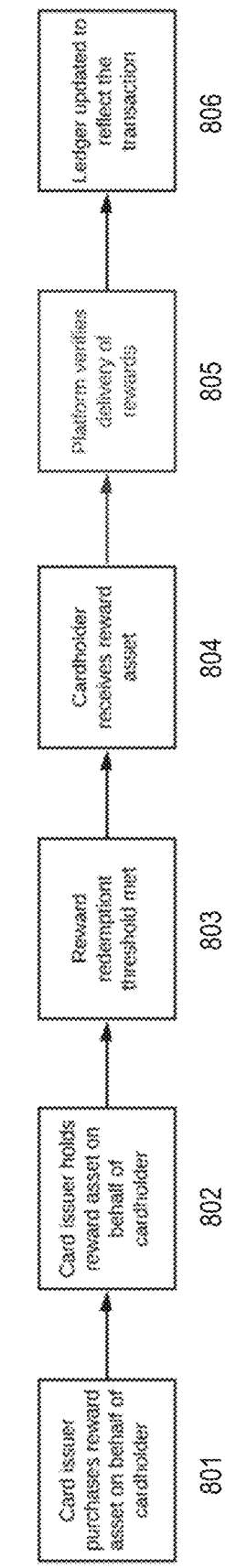
FIG. 8 depicts a flow diagram of a process in which the platform avoids delivering the reward assets before ensuring that a reward redemption threshold is met.

FIG. 8 depicts a flow diagram of a process 800 in which the platform avoids delivering the reward assets before ensuring that a reward redemption threshold is met. Once the reward redemption threshold is met, the reward asset can be disbursed to the cardholder. In order to disburse the reward asset, the platform may load the necessary information into a disbursement queue. The platform will distribute the reward asset from a corporate wallet or an escrow account, and then the platform may verify confirmation of the delivery. The escrow account may be owned by the platform or the card issuer.

More specifically, the platform may purchase a reward asset on behalf of a cardholder for purchases completed using a specialized payment card during a cycle (step 801). Then, the platform may hold the reward asset on behalf of the cardholder (step 802). Responsive to determining that the reward redemption threshold has been met (step 803), the platform may disburse the reward asset so that the cardholder receives it (step 804). Thereafter, the platform may verify delivery of the reward asset (step 805). For example, if it is an off-chain transaction (i.e., the transfer occurs off of the blockchain), the platform could verify delivery through the response from the API call that initiated the request for the transaction. Conversely, if the transaction occurs on the blockchain, the platform may assume the transaction has been successfully complete after a certain number of confirmations on the blockchain (also referred to as the "confirmation threshold"). The platform can use API calls to the blockchain with or without using a third-party service to verify the number of confirmations. Verification of delivery of the reward asset (and recording of a corresponding entry in the ledger maintained by the platform) should be assumed to occur in most embodiments. Such action not only improves the security and reliability of the disbursement process, but also allows the platform to maintain a digital record of disbursements.

Following verification, the platform may update its ledger to reflect the transaction (step 806). In some embodiments, the platform maintains a single ledger for all cardholders. In other embodiments, the platform maintains a separate ledger for each cardholder or each subset of cardholders (e.g., those having the same cycle).

The card issuer can create a set of criteria for determining the reward threshold, and the platform can automatically check to see if these criteria have been met on a continuous basis. For instance, if the reward redemption threshold is set on a one-month cycle, the platform can automatically disburse any held, earned rewards at the end of the one-month period. In another embodiment, the reward threshold may be a certain value of the rewards, as calculated in dollars (USD) or some other currency. The platform can calculate the sum of rewards a cardholder has earned but not been delivered through its ledger. Additionally, it can translate this value into another currency, such as Bitcoin, through requesting the market price of Bitcoin through an API call to an exchange and then converting the USD amount into Bitcoin. By automatically testing whether or not the reward redemption threshold is met, the platform replaces an otherwise time-intensive, manual test that is prone to human error. Additionally, since the platform can continuously check whether or not the reward redemption threshold has been hit, it can automatically disburse the rewards to the cardholder as soon the threshold is met, allowing the cardholder to receive access to their rewards quicker than would conventionally occur.

Figure 19:
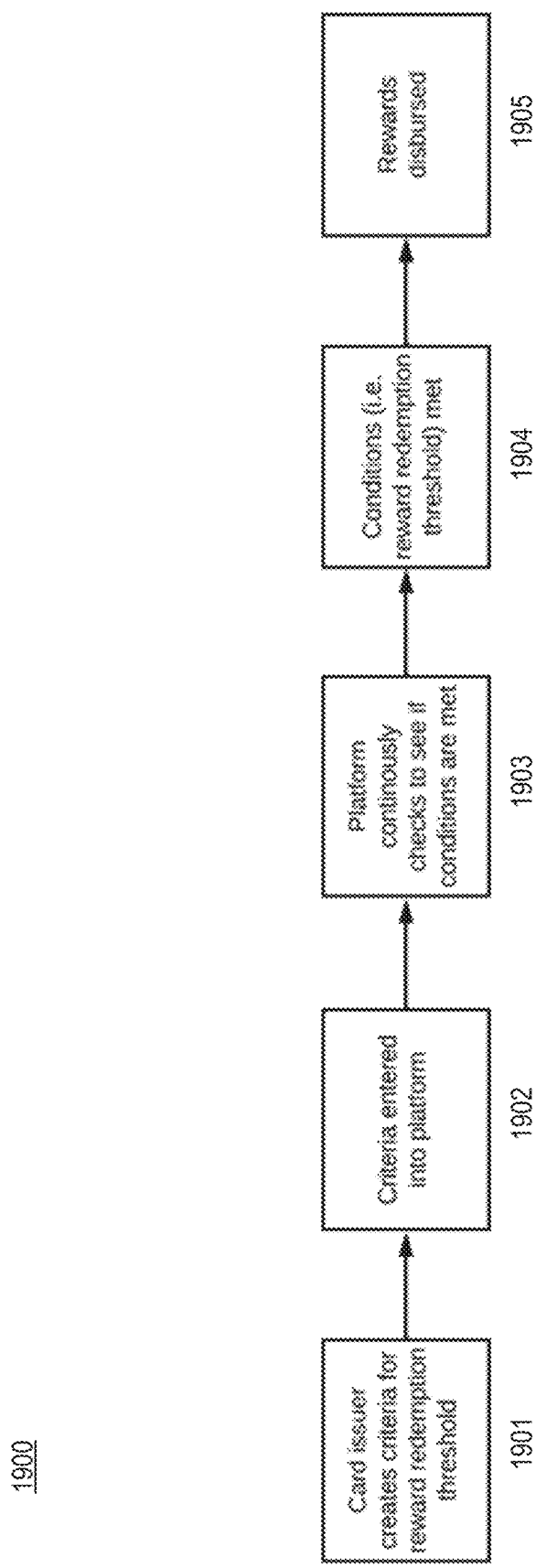
FIG. 19 depicts a flow diagram of a process in which a card issuer establishes criteria for the reward redemption threshold and the platform automatically checks to see if these criteria are met.

FIG. 19 depicts a flow diagram of a process 1900 in which a card issuer establishes criteria for the reward redemption threshold and the platform automatically checks to see if these criteria are met. The card issuer can create one or more conditions that need to be met in order for the rewards to be disbursed (step 1901) and enter those condition(s) into the platform as redemption criteria (step 1902). The platform can then continuously check to see if these condition(s) are met (step 1903). When the condition(s) are met (Step 1904), the platform automatically disburse the rewards (step 1905). As described above, the platform may verify that the rewards have been disbursed appropriately and then update the corresponding ledger and/or cardholder account as necessary.

Figure 20:
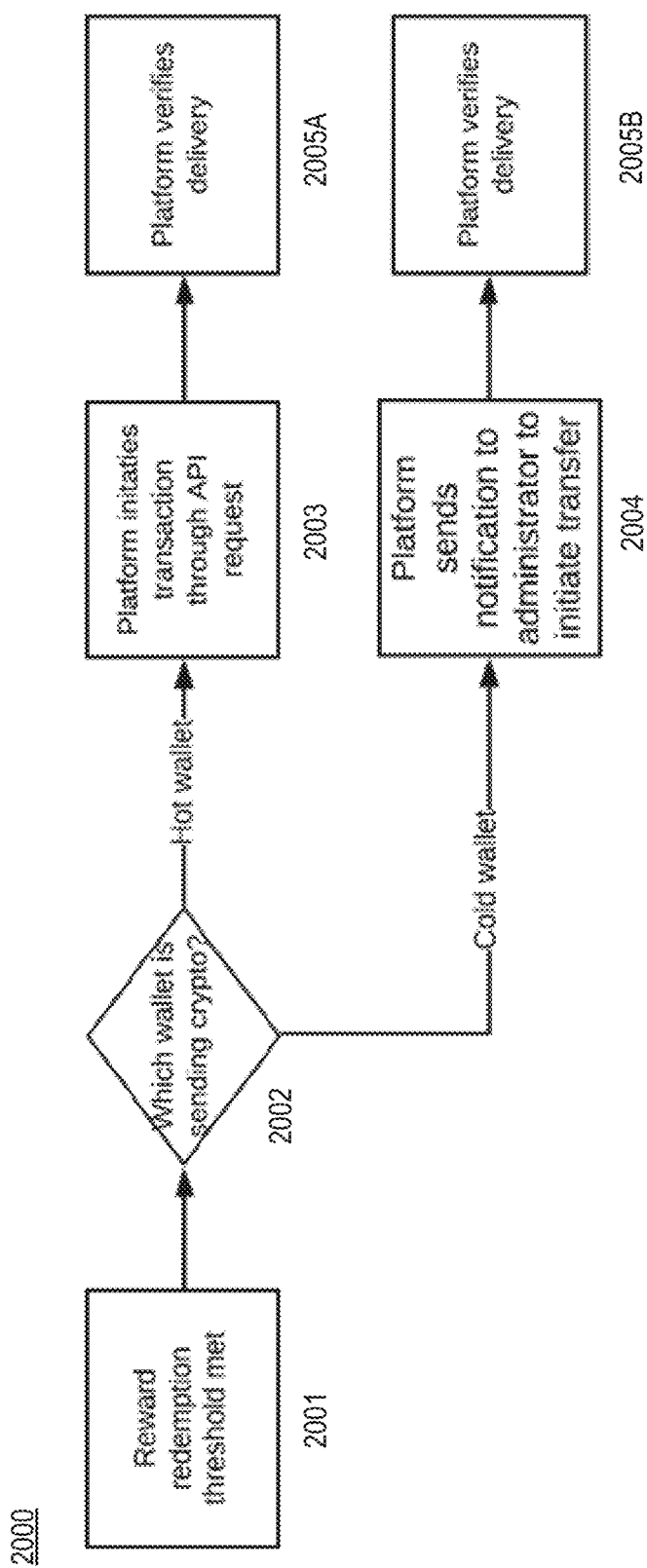
FIG. 20 depicts a flow diagram of a process in which a platform automatically distributes cryptocurrency rewards responsive to a determination that the reward redemption threshold has been met.

After the reward redemption threshold is met, the platform can automatically initiate a transfer of the cryptocurrency rewards to the cardholder. FIG. 20 depicts a flow diagram of a process 2000 in which a platform automatically distributes cryptocurrency rewards responsive to a determination that the reward redemption threshold has been met. After determining that the reward redemption threshold has been met (step 2001), the platform can identify the wallet from which the rewards should be disbursed (step 2002). If the cryptocurrency rewards will be disbursed from a wallet held online (also referred to as a "hot wallet"), the platform will initiate the transaction through an API request to the exchange or the site responsible for hosting the wallet (step 2003). If the cryptocurrency rewards will be disbursed from a wallet held offline (also referred to as a "cold wallet"), a notification may be sent to an administrator that specifies cryptocurrency needs to be transferred from the cold wallet into a hot wallet or another cold wallet (step 2004). After the cryptocurrency rewards have been disbursed, the platform may verify their delivery (steps 2005A-B). By automating the disbursement of cryptocurrency rewards after a reward redemption threshold is met, the platform simplifies the error-prone, time-intensive process of manually initiating disbursements. Additionally, automated distribution allows cardholders to receive their rewards sooner and reduces the likelihood that rewards will be distributed to the wrong wallet—a critical risk in irrevocable blockchain transactions.

Figure 9:
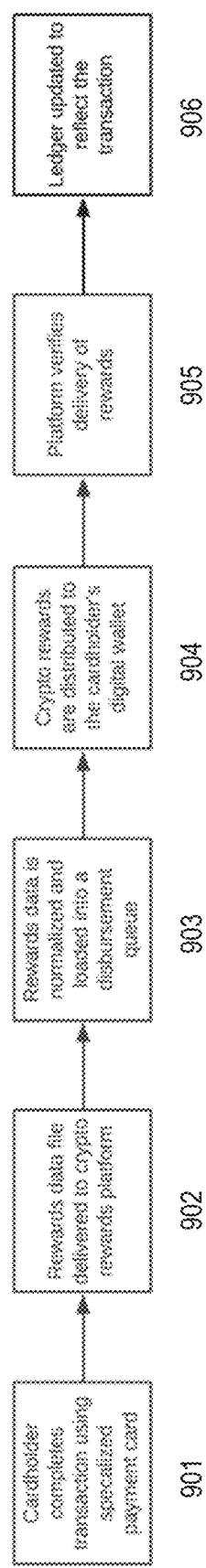
FIG. 9 depicts a flow diagram of a process in which the platform distributes a reward asset and then confirms delivery to its intended address.

FIG. 9 depicts a flow diagram of a process 900 in which the platform distributes a reward asset and then confirms delivery to its intended address. After a cardholder completes a transaction using a specialized payment card (step 901) and the related rewards data file is delivered to the platform (step 902), the platform can normalize the rewards data file and then load the data into a disbursement queue (step 903). As the tasks are performed and cryptocurrency rewards are disbursed to the customers' digital wallets (step 904), the platform will work to verify delivery of the cryptocurrency rewards (step 905). After the rewards are confirmed as delivered, the platform may update its ledger (step 905). Additional information on how delivery of reward assets can be confirmed in the context of a loyalty program can be found in U.S. application Ser. No. 16/523, 814.

Figure 10:
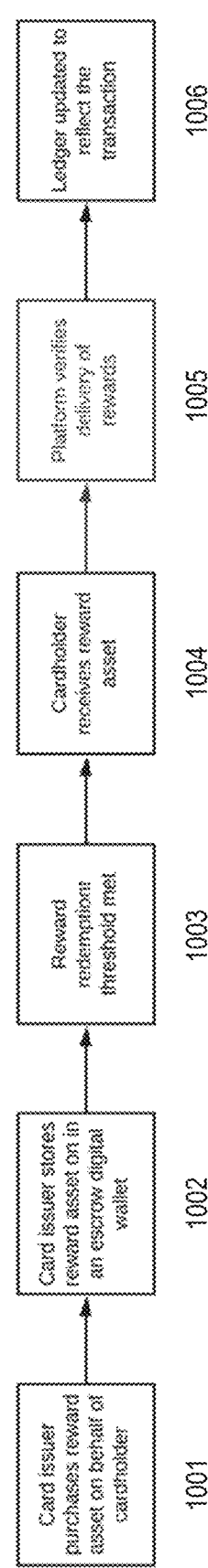
FIG. 10 depicts a flow diagram of a process for storing the cryptocurrency reward earned by a cardholder in an escrow account until a redemption threshold is met.

Another technique for achieving a similar outcome would be to place the reward asset in an escrow account or, in the case of cryptocurrencies, a digital wallet, as shown in FIG. 10. FIG. 10 depicts a flow diagram of a process 1000 for storing the cryptocurrency reward earned by a cardholder in an escrow account until a redemption threshold is met. After the platform purchases the cryptocurrency reward (step 1001), it can store the cryptocurrency reward in an escrow digital wallet (step 1002). Responsive to determining that the reward redemption threshold has been met (step 1003), the platform may automatically distribute all earned cryptocurrency rewards to the cardholder (step 1004). Then, the platform can confirm delivery of the cryptocurrency rewards (step 1005). After the rewards are confirmed as delivered, the platform may update its ledger (step 1006).

In such embodiments, the reward asset would remain in the escrow account or the digital wallet until a redemption threshold is met. This digital wallet could be hosted by an exchange or another online wallet provider or it could be a hardware wallet that is generally offline (also referred to as a "cold wallet"). Such action can ensure that the platform is protected from losses resulting from issuing fraudulent, illegitimate, or unearned rewards, while still allowing the cardholder to benefit from any gains in the value of the asset rewards. In some embodiments, the platform has custody over the assets stored in the digital wallet. This allows the platform to adjust the amount based on any changes in the rewards owed. For example, responsive to determining that a transaction was deemed fraudulent, the platform may be able to alter the assets to be rewarded to the cardholder by removing at least a portion of the assets from the digital wallet. In other embodiments, another party, such as an exchange, could have custody of the assets stored in the digital wallet.

Figure 11:
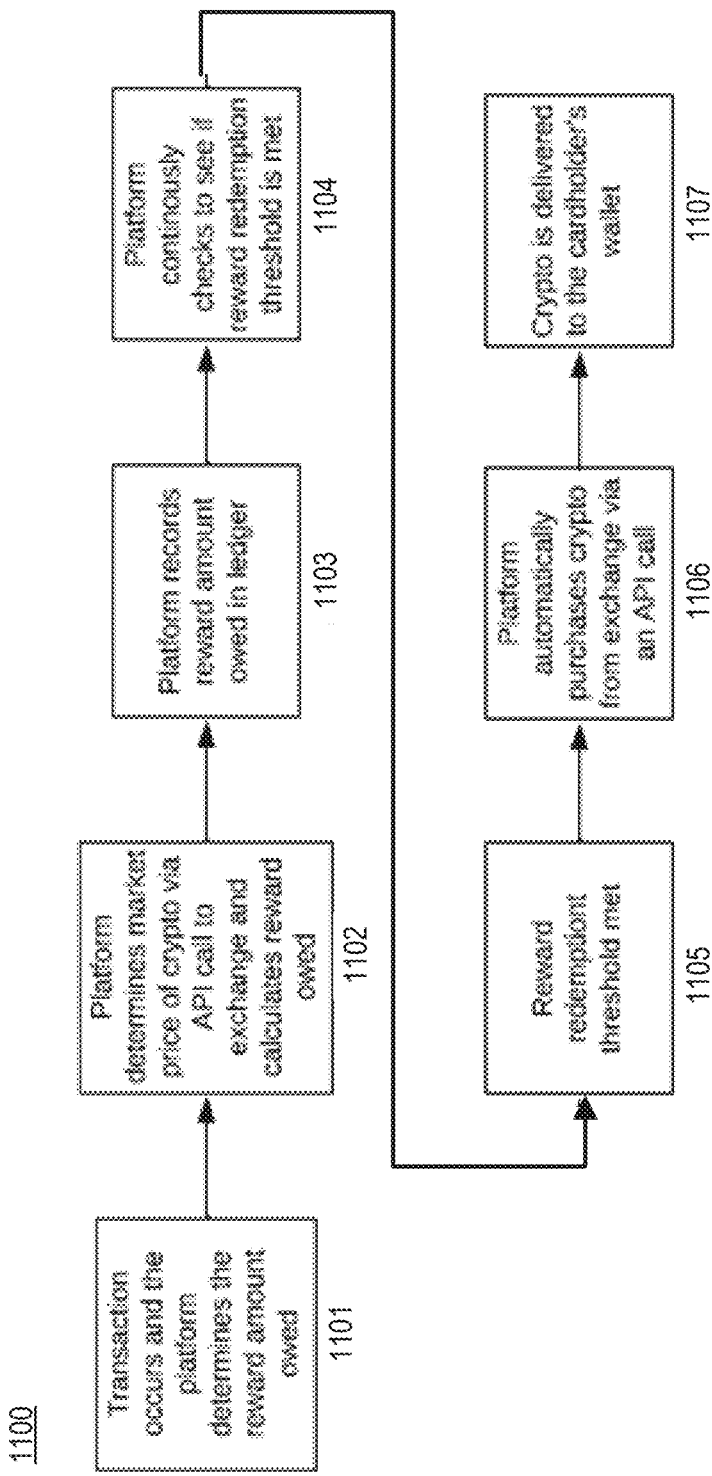
FIG. 11 depicts a flow diagram of a process in which the platform does not purchase the asset reward earned by the cardholder upon receiving information regarding the transaction, but instead issues a guarantee to the cardholder that she will receive the reward asset at the strike price.

FIG. 11 depicts a flow diagram of a process 1100 in which the platform does not purchase the asset reward earned by the cardholder upon receiving information regarding the transaction, but instead issues a guarantee to the cardholder that she will receive the reward asset at the strike price. In this embodiment, the strike price is the market value of the cryptocurrency at the time of the transaction. The guarantee may function similar to a call option in that the cardholder has the right to "buy" the reward asset at the strike price. In such embodiments, the call option could be automatically executed once the redemption threshold(s) are met and bought with the rewards earned by the cardholder. For illustrative purposes, the reward asset guarantee may be referred to as a "reward call option." By not holding the asset reward, the platform can lower, or even eliminate, the risk of the asset being stolen during the cycle.

FIG. 11 depicts a flow diagram of a process 1100 in which the platform guarantees the cardholder the reward asset at the strike price, but the cardholder only receives the reward asset once a reward redemption threshold is met. After a transaction occurs, the platform can determine the amount of rewards owed for that transaction (step 1101) and then calculate the equivalent amount of cryptocurrency owed through an API call to an exchange requesting the current price of the cryptocurrency (step 1102). The platform can record the amount of cryptocurrency owed to the cardholder in a ledger (step 1103), and then the platform can continuously check to see if the condition(s) associated with the reward redemption threshold have been met (step 1104). After the condition(s) are met (step 1105), the platform can automatically initiate a purchase order for the amount of cryptocurrency owed via an API call (step 1106) and distributes the purchased cryptocurrency to the cardholder (step 1107). This automatic process for guaranteeing, purchasing, and distributing cryptocurrency rewards to cardholders eliminates the need for the platform to hold cryptocurrency for an extended period of time, thereby greatly reducing the risk of theft or loss of funds. For example, if a cardholder spent $100 and earned $1 worth of Bitcoin at a price of $10,000 (i.e., 0.0001 Bitcoin), the platform could record that information. If the condition(s) for reward redemption were met at a later date when the price of Bitcoin was $15,000, the platform would automatically purchase 0.0001 Bitcoin and distribute it to the cardholder. In a conventional process, a card issuer would only purchase and disburse 0.000067 Bitcoin (i.e., $1/$15,000) thereby providing less value to the cardholder.

Another technique for achieving a similar result would be for the platform to purchase a futures product equal to the value of the rewards earned by the cardholder for each transaction or for a group of transactions (e.g., all transactions occurring over a twenty-four hour period). In order to facilitate this process, the platform would connect to an exchange via its API and purchase a futures product equal to the amount of rewards earned by the cardholder for the designated transaction(s). The expiration date for the future product would be set to a predetermined time period. For example, the expiration date may be set to coincide with the end of a cycle, or the expiration date could be set 30 days from the day the future product was purchased.

Figure 12:
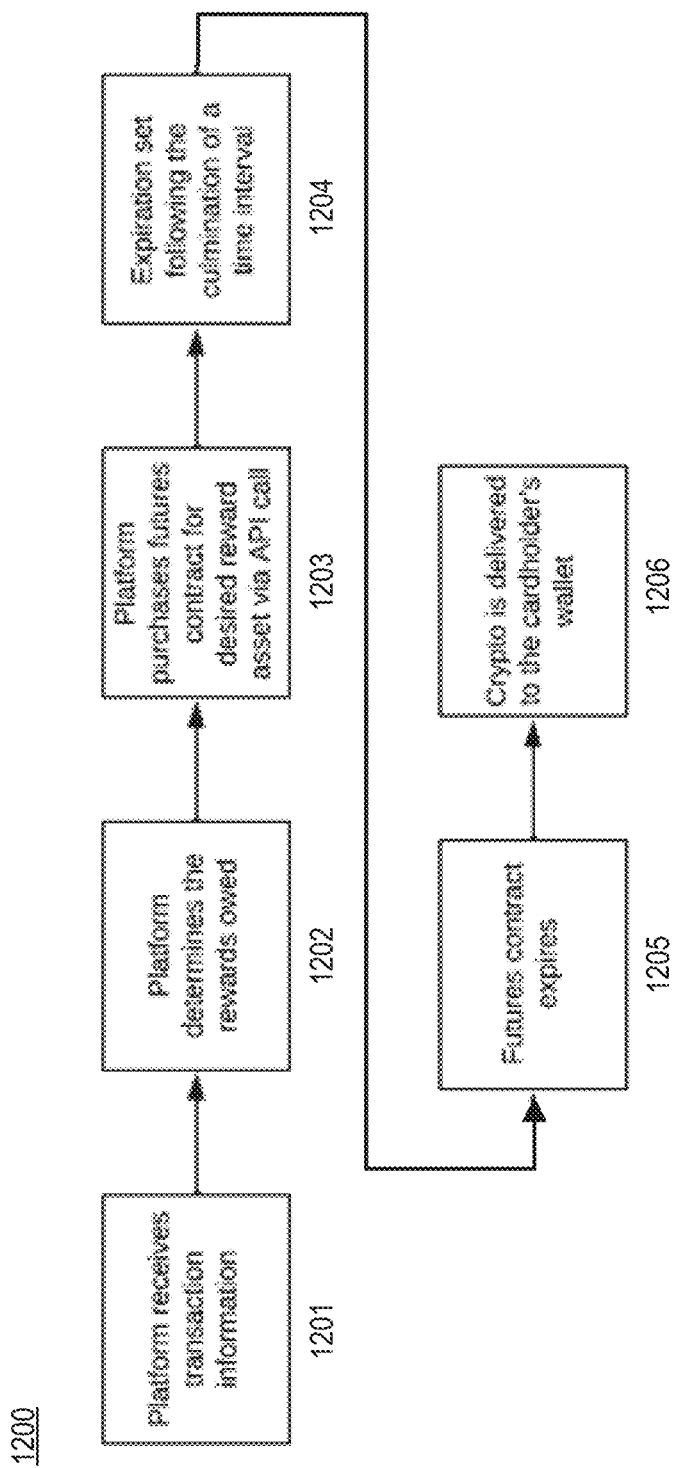
FIG. 12 depicts a flow diagram of a process in which a cardholder receives the reward assets from a futures contract.

When the futures contract is executed, the asset could be delivered to either the platform or the cardholder. A series of tests may be used to determine which party receives the asset. For example, a card issuer may require that there were no returns or indications of fraud on the charges related to the rewards within a certain interval of time (e.g., 7, 15, or 30 days) as part of a reward redemption threshold in order for the cardholder to receive custody once the futures contract expires. FIG. 12 depicts a flow diagram of a process 1200 in which a cardholder receives the reward assets from a futures contract. After the platform receives the information regarding a transaction that was completed using a specialized payment card (step 1201), it will determine the amount of rewards owed to the cardholder for that transaction (step 1202). The platform can then automatically purchase a futures contract for the desired reward asset in the amount owed to the cardholder through an API call to an exchange (step 1203). In some embodiments, the platform sets the expiration of the contract to occur after a certain time interval (step 1204). In such embodiments, after the contract expires (step 1205), the reward asset will automatically be disbursed to the cardholder (step 1206). By not holding the asset reward, the platform lowers, or even eliminates, the risk of the asset being stolen or lost through another manner. Moreover, using a futures contract could also mitigate the foreign exchange risk of holding notoriously volatile assets such as cryptocurrencies.

Figure 13:
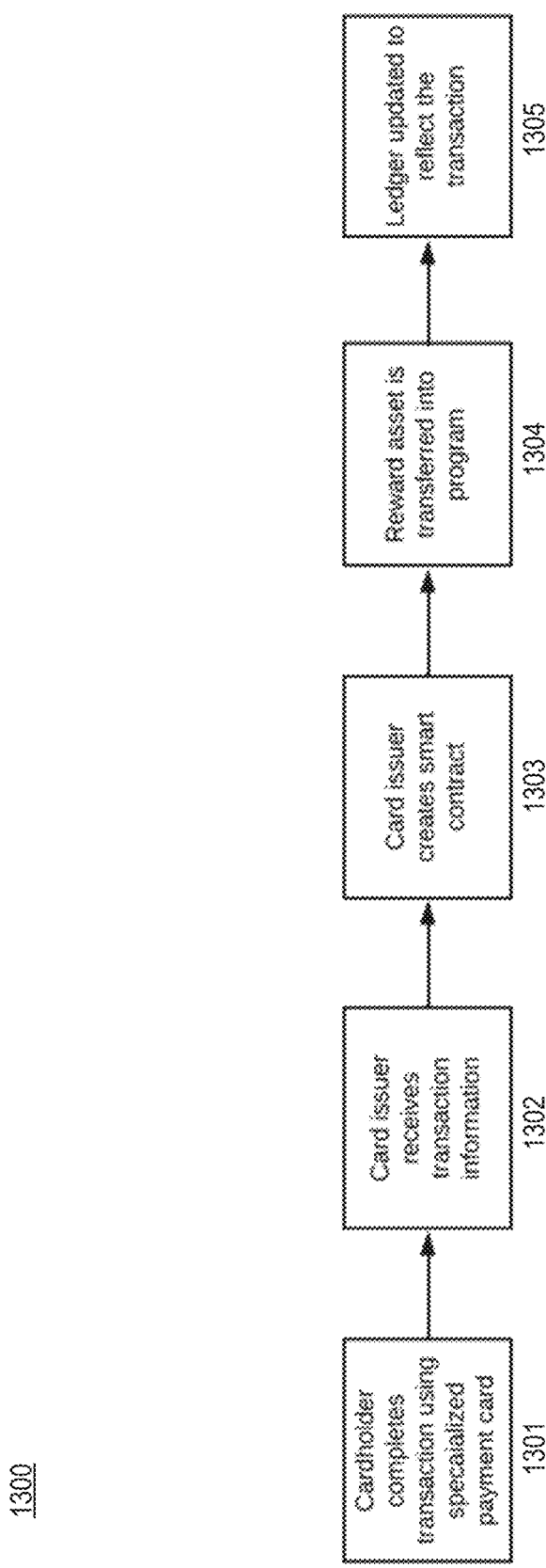
FIG. 13 depicts a flow diagram of a process in which the reward call option functions through a smart contract.

FIG. 13 depicts a flow diagram of a process 1300 in which the reward call option functions through a smart contract. More specifically, when the platform receives information regarding a transaction involving a specialized payment card, a smart contract can be created to ensure that the appropriate reward asset is transferred to the cardholder. The term "smart contract" refers to a computer protocol intended to digitally facilitate, verify, or enforce the performance of a contract. Since smart contracts generally exist on a distributed, decentralized blockchain network, no trusted third party is needed to oversee or execute the contract. Thus, the platform may create a blockchain-based smart contract to ensure the transfer of the appropriate reward asset that is visible to all users of the blockchain. In addition to possibly saving time, money, and compute resources, the decentralized nature of the blockchain provides more security for the smart contract. In some embodiments, the platform is designed to create smart contracts for batches of transactions (e.g., all transactions completed by a given cardholder during a predetermined interval of time, all transactions completed by a group of cardholders during a predetermined interval of time, etc.).

There are several upsides to using smart contracts. For instance, since smart contracts are programmed, the code cannot be biased in its execution. This means there cannot be disputes that lead to unfortunate circumstances, such as the funds in escrow being paid unfairly or to the wrong party. However, there are also several downsides to using smart contracts. One possible downside is the transaction fees (also referred to as "network fees") that accompany the creation of smart contracts for some assets such as Ether. In some instances, the network fee could cost more than the value of the asset being rewarded to the cardholder.

Figure 14:
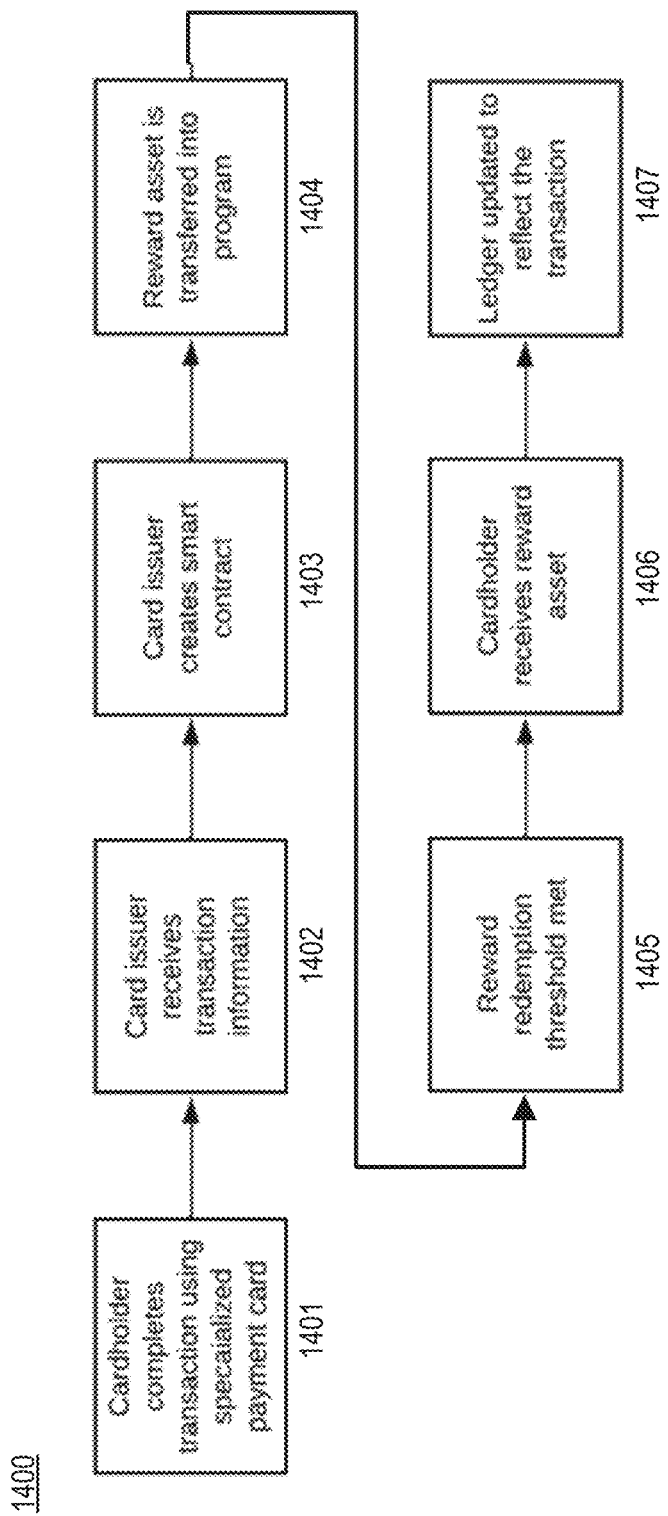
FIG. 14 depicts a flow diagram of a process in which the redemption threshold is met, and therefore the reward asset is provided to the cardholder.
Figure 15:
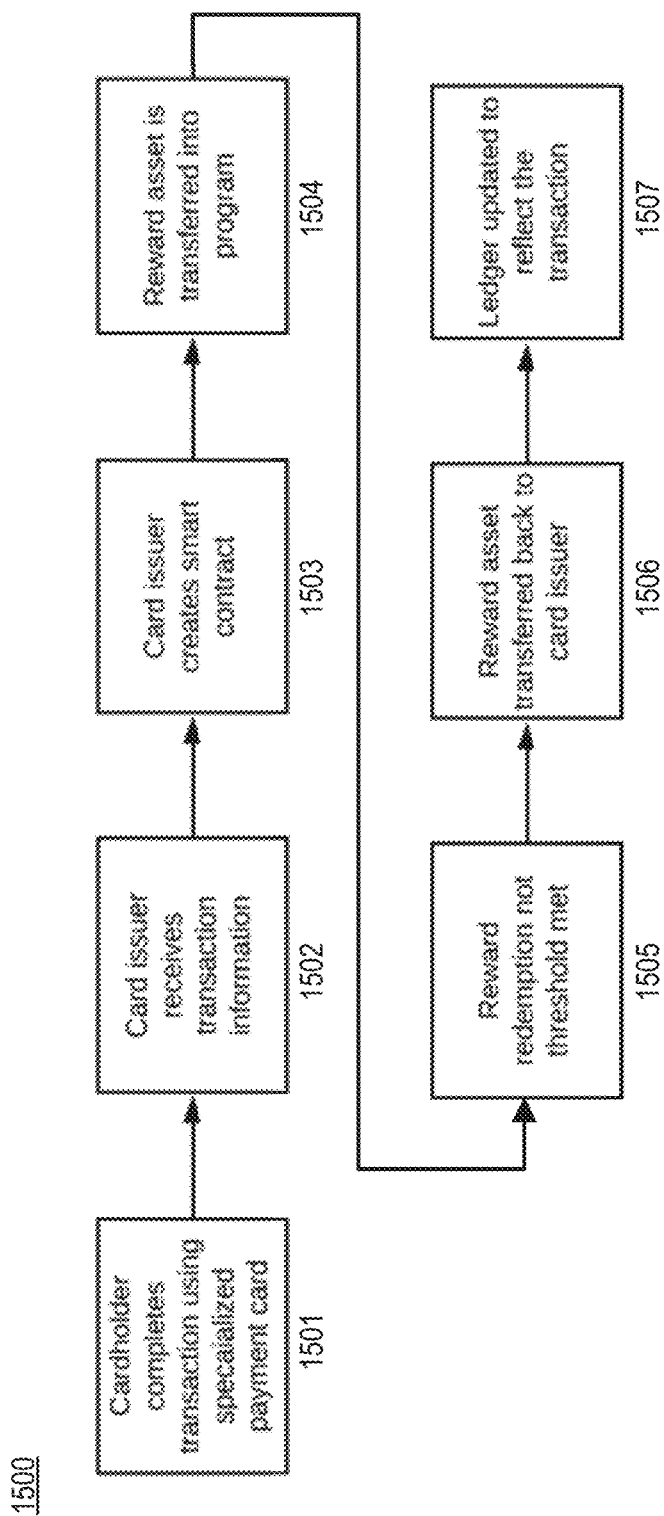
FIG. 15 depicts a flow diagram of a process in which the redemption threshold is not met, and therefore the reward asset is returned to the platform.
Figure 16:
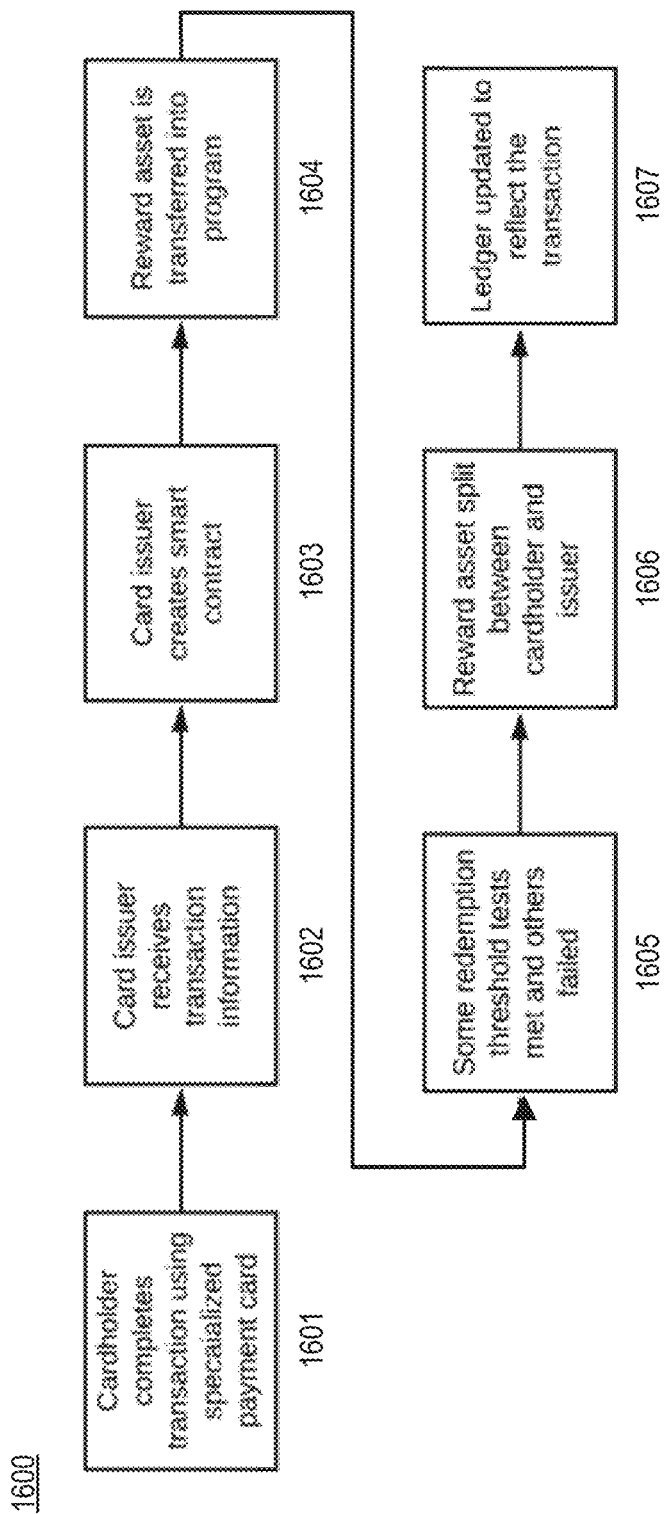
FIG. 16 depicts a flow diagram of process in which a reward asset is divided between the cardholder and the platform when a subset of the redemption thresholds included in a smart contract are met.

The smart contract can be set up to validate whether or not the redemption threshold is met by analyzing the data pushed to it. As shown in FIG. 14, if the redemption threshold is met, then the reward asset may be provided to the cardholder. However, if the redemption threshold is not met, then the reward asset may be returned to the platform, as shown in FIG. 15. Within a single smart contract, it is possible that certain redemption thresholds are met while others are not, which would result in a first portion of the reward asset being provided to the cardholder and a second portion of the reward asset being returned to the platform. FIG. 16 depicts a flow diagram of process 1600 in which a reward asset is divided between the cardholder and the platform when a subset of the redemption thresholds included in a smart contract are met. Such a process allows the platform to programmatically issue rewards based on a pre-set list of conditions, thereby creating a much more efficient process. Not only does the process save the platform valuable time, but it also limits the risk of paying out unearned rewards. The process also allows the cardholder to have their rewards invested into the reward asset in real time, subjecting their rewards to any increases in value over time until the redemption threshold(s) are met (e.g., until the conclusion of a payment period). Additionally, the process lowers the financial risk to cardholders as rewards are invested over time (e.g., as a series of smaller investments rather than a single, large investment).

A separate smart contract could be created each time the platform receives information regarding a transaction that has been completed using a specialized payment card. Another option would be to update an existing smart contract with the information from future transactions using a specialized payment card or if there are any adjustments on the earned rewards.

Figure 17:
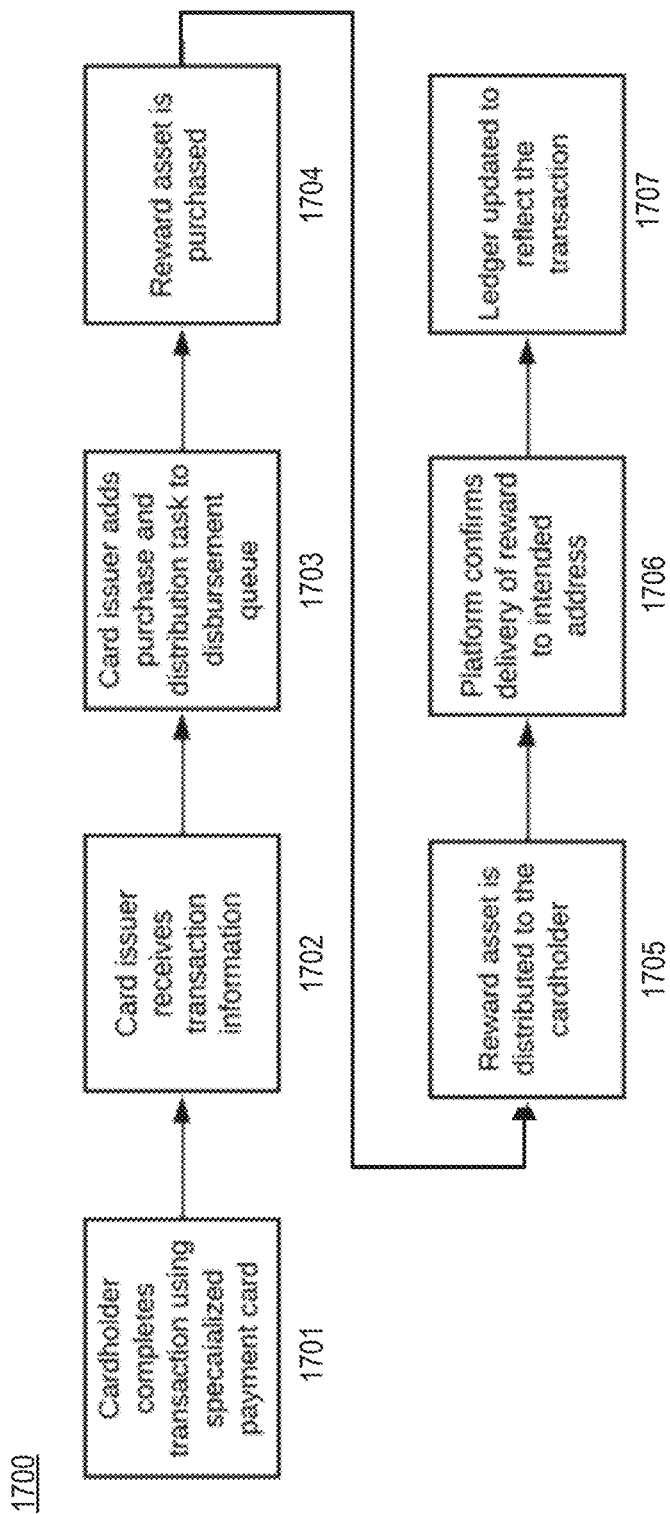
FIG. 17 depicts a flow diagram of a process in which the platform purchases an asset reward earned by a cardholder and then delivers the asset reward to the cardholder responsive to receiving information regarding the transaction.

FIG. 17 depicts a flow diagram of a process 1700 in which the platform purchases an asset reward earned by a cardholder and then delivers the asset reward to the cardholder responsive to receiving information regarding the transaction. Initially, a cardholder completes one or more transactions using a specialized payment card (step 1701). Then, information regarding these transaction(s) will be delivered to the platform for further analysis (step 1702). The information could be received when approval is requested for the transaction as shown in FIG. 3, the information could be received when the funds are requested to pay for the transaction as shown in FIG. 4, or the information could be received after any adjustments are made to the transaction amount as shown in FIG. 5. In some embodiments, the platform is designed to group multiple transactions together in a batch. For example, the platform may group transactions that occur on a daily basis so that a single batch is created for each day. A batch of transactions could be associated with a single cardholder or multiple cardholders.

After receiving the transaction information, the platform can calculate the amount of rewards owed to the cardholder and add the task to purchase and/or distribute the reward asset to its disbursement queue (step 1703). The decision to purchase and/or transfer the reward asset to the cardholder could be dependent on a specific condition. For example, the platform may only purchase and/or transfer the reward asset if the transaction involving the specialized payment card is approved. In some embodiments, the actual purchase/transfer will occur after the approval is given. In this scenario, the task would be added to the disbursement queue for processing by the platform. The task may be executed immediately or at a later time as decided by the platform.

In some embodiments, the platform purchases the reward from an exchange via an API call (step 1704) and then distributes it to the cardholder (step 1705). In other embodiments, the platform distributes owned cryptocurrency held in a corporate wallet to the cardholder. After the reward is disbursed, the platform can confirm delivery to the intended address (step 1706) and update its ledger to reflect the transaction (step 1707). The process shown here can provide rewards to the cardholder in real time, as well as give the cardholder full custody of the rewards, to provide the most value. Because cardholders can transact with specialized payment cards multiple times per day with the cryptocurrency having different market prices for each transaction, this automated process of calculating the reward owed, purchasing the reward, and then distributing it improves the likelihood that the appropriate amount of cryptocurrency is disbursed. Moreover, this process greatly reduces the likelihood that an error occurs in distributing the cryptocurrency and the time required if it were performed manually. Conventionally, this process would only occur once per cycle, so this improved process provides much greater benefit to the cardholder through their opportunity to experience gains in value on their rewards. Additionally, since the rewards are earned continuously throughout each day over the course of the month, the risk of earning a notoriously volatile asset is greatly reduced.

In the case that the rewards are deemed ineligible after disbursement, the platform may deduct the amount (also referred to as "net out") from future rewards earned by using the specialized payment card. For instance, if a cardholder receives ten dollars' worth of Bitcoin for a purchase of an item valued at $1,000 but later returns the item, the card issuer may withhold the next ten dollars' worth of Bitcoin earned in rewards. Since the platform records each transaction in a ledger, it will always know the amount of rewards paid to cardholders for each specific transaction. If a cardholder were to return an item, the platform would receive the transaction information of that return and could match it to the corresponding reward delivery. Since it may be unfeasible or undesirable to recollect a previously delivered reward, the platform can deduct from future rewards paid to the cardholder the amount of the rewards that should be recollected. This process allows the card issuer to minimize its expenses of paying out unearned rewards while avoiding the work needed to recollect rewards. Additionally, the cardholder avoids the unpleasant user experience of having their rewards recollected.

In order to minimize the risk to the platform, the tests utilized for the redemption threshold (e.g., whether a transaction was finalized, whether the purchased good was returned, whether fraud occurred on the transaction) can be used to check whether any subsequent adjustments are needed. In some embodiments, the platform automatically issues a reward in the form of cryptocurrency responsive to discovering that a transaction was completed by a cardholder using a specialized payment card. However, if the platform discovers that the reward is no longer appropriate (e.g., because the cardholder returned a good purchased in the transaction), the card issuer may reclaim at least a portion of the issued reward (e.g., if the issued reward is delivered to an account associated with Coinbase). If the reward was delivered to an account associated with an exchange, it is possible that the platform may be able to reclaim the asset through sending the asset back to a corporate wallet. It can achieve this through an API call to the exchange. In other embodiments, it will be unfeasible to recollect rewards as blockchain transactions are irreversible or the exchange will not provide API support for initiating transactions on behalf of others' accounts. In this scenario, the platform can deduct the amount of the now ineligible rewards from any future rewards earned by the cardholder.

In some embodiments, if an adjustment is necessary, the appropriate amount is deducted from future rewards earned by the cardholder. For example, if a cardholder purchases an item for $100, receives a reward asset having a value of approximately one percent of the purchase price (i.e., $1), and then subsequently returns the item, the cardholder may not receive any rewards for the next one-hundred dollars' worth of eligible purchases. In other embodiments, if an adjustment is necessary, the appropriate amount is deducted from past rewards earned by the cardholder. For example, the platform may initiate a transfer of cryptocurrency from an account associated with the cardholder (e.g., on an exchange) to another account associated with the platform (e.g., on the same exchange or a different exchange).

Rewards Platform

Figure 23:
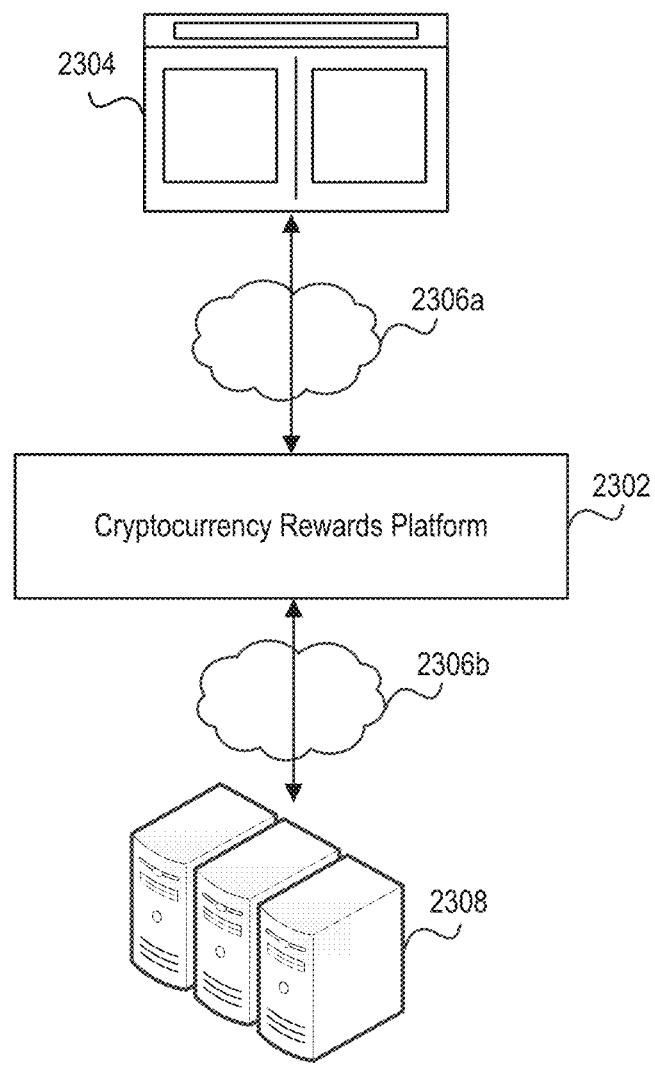
FIG. 23 illustrates a network environment that includes a rewards platform.

FIG. 23 illustrates a network environment 2300 that includes a rewards platform 2302 (or simply "platform").

The platform 2302 may be referred to as a "cryptocurrency rewards platform" if it is designed to disburse cryptocurrency as a reward to cardholders for completing transactions with specialized payment cards.

Individuals can interface with the platform 2302 via an interface 2304. The platform 2302 may be responsible for examining transactions completed by a cardholder using a specialized payment card, identifying an appropriate cash reward based on a value of the transactions, converting the appropriate cash reward into cryptocurrency, etc. The platform 2302 may also be responsible for creating interfaces through which a cardholder can examine cryptocurrency-related information (e.g., account balance, the current value of various cryptocurrencies, recommendations regarding investment strategies), manage investment/disbursement preferences (e.g., by specifying which cryptocurrencies should be invested in, or how the cash reward should be distributed amongst multiple cryptocurrencies), manage platform preferences (e.g., login credentials), etc.

As noted above, the platform 2302 may reside in a network environment 2300. Thus, the platform 2302 may be connected to one or more networks 2306a-b. The network(s) 2306a-b can include personal area networks (PANs), local area networks (LANs), wide area networks (WANs), metropolitan area networks (MANs), cellular networks, the Internet, etc. Additionally or alternatively, the platform 2302 can be communicatively coupled to electronic device(s) over a short-range communication protocol, such as Bluetooth® or Near Field Communication (NFC).

The interface 2304 is preferably accessible via a web browser, desktop application, mobile application, or over-the-top (OTT) application. Accordingly, the interface 2304 may be viewed on a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

Some embodiments of the platform 2302 are hosted locally. That is, the platform 2302 may reside on the electronic device used to access the interface 2304. For example, the platform 2302 may be embodied as a mobile application executing on a mobile phone. Other embodiments of the platform 2302 are executed by a cloud computing service operated by Amazon Web Services® (AWS), Google Cloud Platform™, Microsoft Azure®, or a similar technology. In such embodiments, the platform 2302 may reside on a host computer server that is communicatively coupled to one or more content computer servers 2308. The content computer server(s) 2308 can include account information (e.g., account balance, an electronic record mapping the account to one or more wallets), user information (e.g., profiles, credentials, and card-related information such as account number, CVV, etc.), wallets, and other assets. Such information could also be stored on the host computer server.

Certain embodiments are described in the context of network-accessible interfaces. However, those skilled in the art will recognize that the interfaces need not necessarily be accessible via a network. For example, an electronic device may be configured to execute a self-contained computer program that does not require network access. Instead, the self-contained computer program may cause necessary assets (e.g., account balance, current value of various cryptocurrencies, recommended investment strategies) to be downloaded at a single point in time or on a periodic basis (e.g., weekly, daily, or hourly).

The products and services offered by the platform 2302 may be whitelisted in some instances. For example, a financial institution responsible for supporting the specialized payment card may affix their own branding to the specialized payment card, the website used to register for the specialized payment card, etc. Similarly, an exchange may be interested in whitelisting the specialized payment card in order to offer the service to their customer base. By whitelisting services performed by the platform 2302, the exchange is able to reinforce customer loyalty, strengthen their brand, and increase revenues.

Use Case

Figure 21:
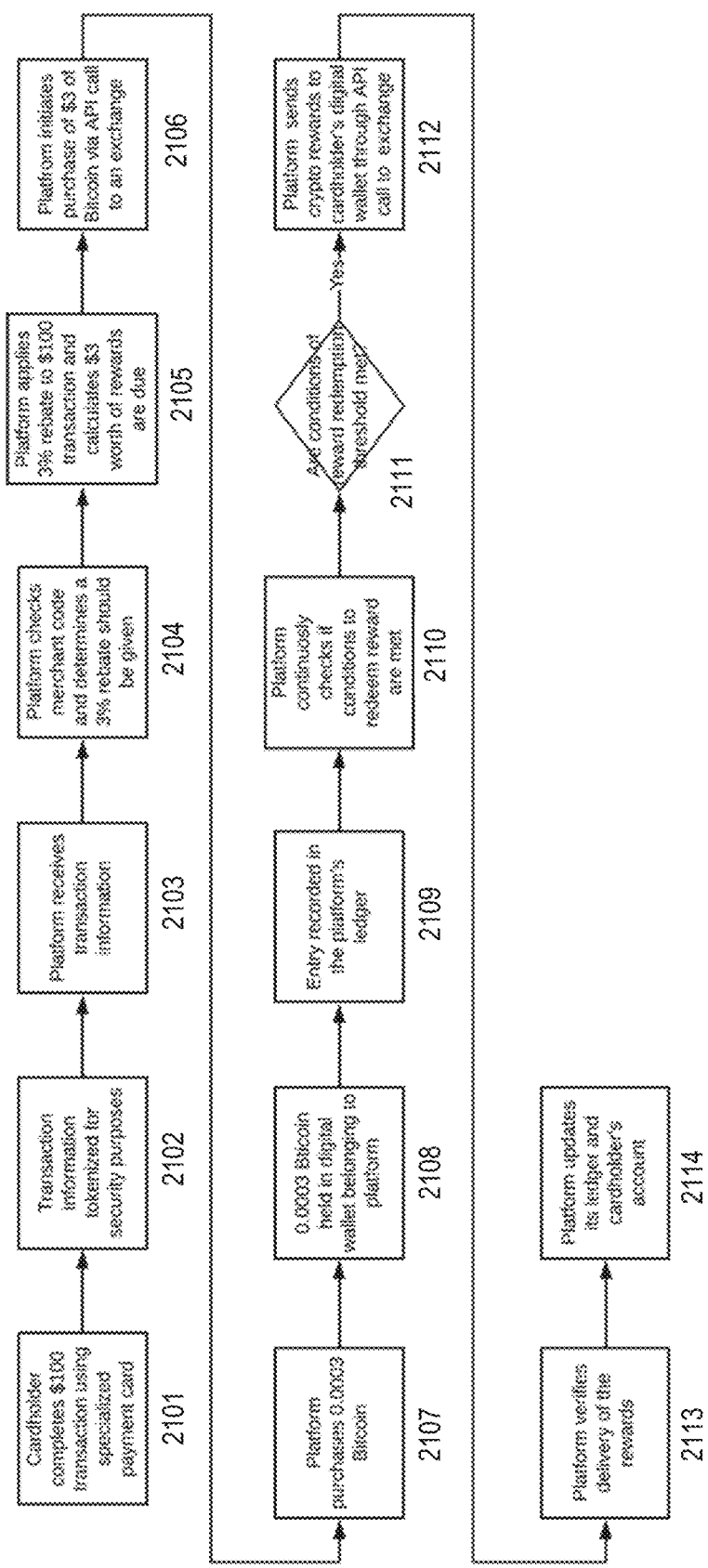
FIG. 21 depicts a flow diagram of a process in which a reward asset is purchased by a cryptocurrency rewards platform near the time at which a cardholder completes a transaction using a specialized payment card but the platform delays disbursement of the reward asset until the conditions of the reward redemption threshold have been met.

FIG. 21 depicts a flow diagram of a process 2100 in which a reward asset is purchased by a cryptocurrency rewards platform near the time at which a cardholder completes a transaction using a specialized payment card but the platform delays disbursement of the reward asset until the conditions of the reward redemption threshold have been met. In FIG. 21, a cardholder conducts a transaction using a specialized payment card having a value of one-hundred dollars (step 2101). Thereafter, the platform receives information regarding the transaction from a payment processor responsible for facilitating the transaction via a network (step 2103). In some embodiments, the transaction information is tokenized by a third party for security purposes prior to transmission to the platform (step 2102). In such embodiments, the tokenized transaction information may be transmitted to the platform by the payment processor or the third party.

The platform can discover characteristics of the transaction by examining the transaction information. Here, for example, the platform has determined that the purchase was made at a restaurant based on the merchant code included in the transaction information, and therefore is eligible to receive a three percent rebate (step 2104). The platform can then apply the rebate rate of three percent to the transaction amount of one-hundred dollars to determine that the cardholder has earned three dollars in rewards for the transaction (step 2105). The platform then initiates a purchase of three dollars' worth of Bitcoin (or some other reward chosen by the cardholder) through an API call to an exchange (step 2106). If the price of Bitcoin is $10,000 at the time that the purchase request is submitted, then the platform would purchase 0.0003 Bitcoin (step 2107). The purchased Bitcoin can then be held in a digital wallet belonging to the platform (step 2108), and the platform can record an entry in its ledger indicating that a purchase of 0.0003 Bitcoin was completed (step 2109).

As part of the agreement agreed to by the cardholder, the card issuer may require certain conditions be met for the reward to be delivered to the cardholder. For instance, the card issuer may require that rewards are only to be delivered after a 30-day period in which there is no indication of fraud and no return of the item for which the rebate was given. If the cardholder bought a television worth one-hundred dollars, for example, the reward may be delivered after a 30-day period during which there was no concern of fraud on the transaction and the television wasn't returned. After the 0.0003 Bitcoin is purchased, the platform can continuously or periodically check throughout the 30-day period to ensure that no fraud occurred on the transaction and that the item was not returned (step 2110). Assuming that all conditions are met (step 2111), the platform can automatically distribute the 0.0003 Bitcoin to the cardholder at the end of the 30-day period. The platform can accomplish this through an API call to the exchange requesting that the 0.0003 Bitcoin be sent to a digital wallet associated with the cardholder (step 2112). In particular, the platform may submit a transfer request to the exchange via the API that specifies the address of the digital wallet belonging to the platform, the address of the digital wallet belonging to the cardholder (e.g., as recorded in a cardholder profile created during registration for the specialized payment card), and the amount of Bitcoin to be transferred.

The platform would then verify delivery of the reward (step 2113) and then update its ledger and/or the cardholder profile (step 2114). Since cryptocurrency is notoriously volatile, it may be the case that Bitcoin's price increased from $10,000 when the reward was earned to $15,000 when the reward was delivered. In conventional loyalty programs, the cardholder would receive 0.0002 Bitcoin for the $3 in rewards since disbursement wouldn't occur until the conclusion of the cycle. Through this improved process, the cardholder would receive 0.0003 Bitcoin, which would ultimately be worth $4.50 when the reward is delivered—a 50% increase in value. With many transactions occurring throughout each cycle, this improved process offers much greater value to the cardholder. Additionally, through setting conditions for the rewards to be delivered and automatically checking if they have been met, the platform greatly reduces the liability of paying out unearned or ineligible rewards.

Processing System

Figure 24:
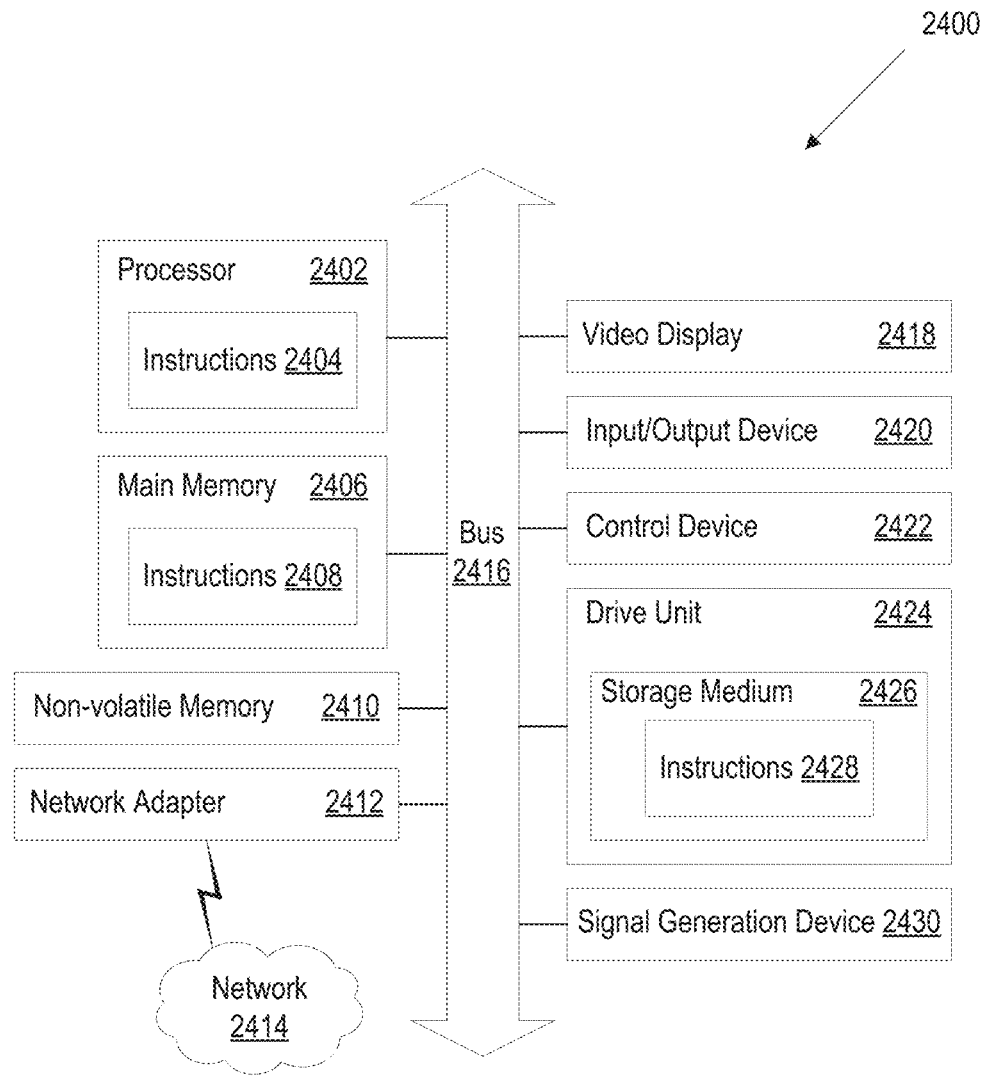
FIG. 24 is a block diagram illustrating an example of a processing system in which at least some operations described herein can be implemented.

FIG. 24 is a block diagram illustrating an example of a processing system 2400 in which at least some operations described herein can be implemented. For example, some components of the processing system 2400 may be hosted on an electronic device that includes a rewards platform (e.g., rewards platform 1802 of FIG. 18). As another example, some components of the processing system 2400 may be hosted on an electronic device configured to manage accounts that include cash rewards and/or cryptocurrencies.

The processing system 2400 may include one or more central processing units ("processors") 2402, main memory 2406, non-volatile memory 2410, network adapter 2412 (e.g., network interface), video display 2418, input/output devices 2420, control device 2422 (e.g., keyboard and pointing devices), drive unit 2424 including a storage medium 2426, and signal generation device 2430 that are communicatively connected to a bus 2416. The bus 2416 is illustrated as an abstraction that represents one or more physical buses and/or point-to-point connections that are connected by appropriate bridges, adapters, or controllers. The bus 2416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 2400 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 2400.

While the main memory 2406, non-volatile memory 2410, and storage medium 2426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 2428. The term "machine-readable medium" and "storage medium" shall also be taken to include any medium that is capable of storing, encoding, or carrying a set of instructions for execution by the processing system 2400.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 2404, 2408, 2428) set at various times in various memory and storage devices in a computing device. When read and executed by the one or more processors 2402, the instruction(s) cause the processing system 2400 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 2410, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 2412 enables the processing system 2400 to mediate data in a network 2414 with an entity that is external to the processing system 2400 through any communication protocol supported by the processing system 2400 and the external entity. The network adapter 2412 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 2412 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method comprising:
   receiving, by a processor via a first application programming interface (API), data related to a specific transaction completed by an individual using a payment card;
   determining, by the processor, that the specific transaction is eligible for a cryptocurrency reward;
   based at least in part on the specific transaction being eligible for the cryptocurrency reward, calculating, by the processor, a reward amount due to the individual based at least in part on a value of the specific transaction separate from other transactions made utilizing the payment card;
   initiating, automatically by the processor and based at least in part on (1) determining that the transaction is eligible for the cryptocurrency reward and (2) receiving the data related to the specific transaction, a purchase of cryptocurrency in an amount based at least in part on (1) a market price of the cryptocurrency at or near a time at which the specific transaction was completed and (2) the reward amount associated with the specific transaction, the initiating including sending a purchase instruction to a first exchange;
   recording, by the processor, the purchase in a blockchain ledger;
   creating, by the processor and on the blockchain ledger, a smart contract including a redemption criterion of the cryptocurrency;
   determining, by the processor and via execution of the smart contract after recording the purchase, that the redemption criterion of the cryptocurrency has been met;
   based at least in part on the redemption criterion of the cryptocurrency being met, sending, by the processor, a transfer instruction to a second exchange via a second application programming interface (API);
   verifying, by the processor, that the cryptocurrency reward has been transferred to the individual for the specific transaction by completing a call to the second exchange through the second API; and
   indicating, by the processor and in a profile associated with the individual, that the transfer was completed successfully based at least in part on receiving an acknowledgement from the second exchange responsive to the call.

2. The computer-implemented method of claim 1, wherein determining that the specific transaction is eligible for the cryptocurrency reward comprises: parsing the data to identify a code representing a merchant involved in the specific transaction; and determining the code corresponds to an entry in a list of codes associated with merchants previously determined to be eligible for rewards.

3. The computer-implemented method of claim 1, wherein the transfer instruction specifies that the cryptocurrency reward should be transferred from a first digital wallet associated with a rewards service to a second digital wallet associated with the individual.

4. The computer-implemented method of claim 1, further comprising: identifying a first digital wallet associated with a rewards service in which the cryptocurrency reward is stored; identifying a second digital wallet associated with the individual; and generating the transfer instruction that specifies an address of the first digital wallet, an address of the second digital wallet, and the cryptocurrency reward.

5. The computer-implemented method of claim 1, wherein the digital blockchain ledger includes a separate entry for individual purchases, individual transfers, and individual disbursements of the cryptocurrency initiated by the processor.

6. The computer-implemented method of claim 1, wherein determining that the redemption criterion of the cryptocurrency has been met comprises determining that an item purchased in the specific transaction has not been returned within a predetermined interval of time.

7. The computer-implemented method of claim 1, wherein the first exchange and second exchange are associated.

8. The computer-implemented method of claim 1, further comprising monitoring conditions associated with the specific transaction until the redemption criterion of the cryptocurrency has been met.

9. A system comprising:
   one or more processors; and
   non-transitory computer-readable media storing instructions that, when executed by the one or more processors, causes the one or more processors to perform operations comprising:
   receiving, via a first application programming interface (API), data related to a specific transaction completed by a cardholder with a merchant using a payment card;

determining a value of the specific transaction based at least in part on the data;

determining a reward amount due to the cardholder for completing the specific transaction separate from other transactions made utilizing the payment card based at least in part on (i) the value and (ii) a rewards criterion;

based at least in part on the rewards criterion being met and receiving the data related to the specific transaction, automatically purchasing cryptocurrency to be used as a cryptocurrency reward in an amount based at least in part on (1) a market price of the cryptocurrency at or near a time at which the specific transaction was completed and (2) the reward amount associated with the specific transaction;

creating, on a blockchain ledger, a smart contract including a redemption criterion of the cryptocurrency;

determining by the smart contract that the redemption criterion associated with the cryptocurrency has been met; and based at least in part on the redemption criterion associated with the cryptocurrency being met, sending a transfer instruction to an exchange via a second application programming interface (API).

10. The system of claim 9, the operations further comprising initiating, based at least in part on determining the redemption criterion associated with the cryptocurrency has been met, the purchase of the cryptocurrency to the cardholder during a rewards cycle.

11. The system of claim 9, wherein purchasing the cryptocurrency comprises: initiating a purchase of the cryptocurrency for the cardholder at the market price at or near the time; and storing the cryptocurrency reward in a digital wallet associated with a rewards service; and wherein the operations further comprising: disbursing the cryptocurrency reward to the cardholder from the digital wallet.

12. The system of claim 9, the operations further comprising: parsing the data to determine a code associated with the merchant; determining the code corresponds to an entry in a list of codes associated with merchants previously determined to be eligible for rewards; and determining the specific transaction is eligible for the cryptocurrency reward based at least in part on the code corresponding to the entry in the list of codes.

13. The system of claim 9, wherein the rewards criterion is representative of a percentage established by a rewards service.

14. The system of claim 9, wherein determining that the redemption criterion associated with the cryptocurrency has been met comprises determining that an item purchased in the specific transaction has not been returned within a predetermined interval of time.

15. The system of claim 9, the operations further comprising verifying that the transfer of the cryptocurrency reward has been completed by completing a call to the exchange via the second API.

16. The system of claim 9, the operations further comprising: verifying that the transfer of the cryptocurrency reward has been completed by: completing a call to the blockchain ledger via a third application programming interface (API) to request a number of confirmations; and determining the number of confirmations satisfies a threshold value.

17. The system of claim 16, the operations further comprising indicating in a profile associated with the cardholder that the transfer was completed successfully based at least in part on the number of confirmations satisfying the threshold value.

18. The system of claim 9, the operations further comprising determining, when additional data related to additional transactions completed by the cardholder using the payment card is received and via the first API, rewards amounts allocated to the cardholder throughout a rewards cycle based at least in part on varying market prices of the cryptocurrency.

19. A computer-implemented method comprising:

identifying a specific transaction completed by a cardholder using a payment card based at least in part on data related to the specific transaction;

determining a reward amount due to the cardholder for using the payment card to complete the specific transaction separate from other transactions made utilizing the payment card based at least in part on a value of the specific transaction and the specific transaction being eligible for a cryptocurrency reward;

based at least in part on determining the specific transaction is eligible for the cryptocurrency reward and identifying the specific transaction, automatically purchasing cryptocurrency to be used as the cryptocurrency reward in an amount based at least in part on a market price of the cryptocurrency at or near a time at which the specific transaction was completed and based at least in part on the reward amount associated with the transaction; and creating, on a blockchain ledger, a smart contract including a redemption criterion of the cryptocurrency;

determining by the smart contract that the redemption criterion associated with the cryptocurrency has been met; and based at least in part on the redemption criterion being met, causing the cryptocurrency reward to be transferred to a digital wallet associated with the cardholder.

20. The computer-implemented method of claim 19, wherein the data is tokenized, and wherein the data is received from at least one of an entity responsible for tokenizing the data or a payment processor responsible for facilitating the transaction.

* * * * *